United States Patent
Wu et al.

(10) Patent No.: US 9,860,896 B2
(45) Date of Patent: Jan. 2, 2018

(54) EPDCCH CANDIDATE DETERMINING METHOD AND DEVICE

(71) Applicant: Huawei Technologies Co., Ltd., Shenzhen, Guangdong (CN)

(72) Inventors: Qiang Wu, Beijing (CN); Jianqin Liu, Beijing (CN); Jianghua Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 170 days.

(21) Appl. No.: 14/802,585

(22) Filed: Jul. 17, 2015

(65) Prior Publication Data

US 2015/0327271 A1 Nov. 12, 2015

Related U.S. Application Data

(63) Continuation of application No. PCT/CN2013/070731, filed on Jan. 18, 2013.

(51) Int. Cl.
*H04W 72/04* (2009.01)
*H04L 12/26* (2006.01)
(Continued)

(52) U.S. Cl.
CPC ......... *H04W 72/0453* (2013.01); *H04L 5/001* (2013.01); *H04L 5/0048* (2013.01);
(Continued)

(58) Field of Classification Search
CPC . H04W 72/0453; H04W 24/02; H04W 72/02; H04W 72/12; H04W 88/08;
(Continued)

(56) References Cited

U.S. PATENT DOCUMENTS

2010/0157922 A1   6/2010   Kim et al.
2011/0110316 A1   5/2011   Chen et al.
(Continued)

FOREIGN PATENT DOCUMENTS

CN   101771462 A   7/2010
CN   102210181 A   10/2011
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, Dec. 2012, 340 pages.
(Continued)

*Primary Examiner* — Pao Sinkantarakorn
*Assistant Examiner* — Kabir Jahangir

(57) ABSTRACT

The present invention discloses an enhanced physical downlink control channel (EPDCCH) candidate determining method and device, and relates to the field of wireless communications, so as to avoid EPDCCH blocking and improve reliability of control information transmission. The method of the present invention includes: determining an EPDCCH resource set p in a subframe k, where the EPDCCH resource set p includes $N_{ECCE,p,k}=q \times r$ enhanced control channel elements (ECCEs), an EPDCCH candidate of an EPDCCH with an aggregation level being L corresponds to L ECCEs having consecutive reference numerals, and an EPDCCH candidate is capable of carrying an EPDCCH; and determining the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

14 Claims, 4 Drawing Sheets

---

Determine the EPDCCH resource set p in a subframe k, where the EPDCCH resource set p includes q resource block pairs, each of the resource block pairs corresponds to r enhanced control channel elements ECCEs, $q \geq 1$, $r \geq 1$, $N_{ECCE,p,k}=q \times r$ indicates the number of ECCEs in the EPDCCH resource set p, reference numerals of the $N_{ECCE,p,k}$ ECCEs are 0, 1, 2, ..., $N_{ECCE,p,k}-1$ respectively, an EPDCCH candidate of an EPDCCH at the aggregation level L corresponds to L ECCEs having consecutive reference numerals, and an EPDCCH candidate is capable of carrying an EPDCCH — 101

Determine the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex — 102

(51) Int. Cl.
*H04W 24/02* (2009.01)
*H04L 5/00* (2006.01)
*H04W 88/08* (2009.01)
*H04W 72/02* (2009.01)
*H04W 72/12* (2009.01)

(52) U.S. Cl.
CPC ............ *H04L 5/0053* (2013.01); *H04L 43/50* (2013.01); *H04W 24/02* (2013.01); *H04W 72/02* (2013.01); *H04W 72/12* (2013.01); *H04W 88/08* (2013.01)

(58) Field of Classification Search
CPC ....... H04L 5/001; H04L 43/50; H04L 5/0048; H04L 5/0053
See application file for complete search history.

(56) References Cited

U.S. PATENT DOCUMENTS

| | | |
|---|---|---|
| 2011/0310817 A1 | 12/2011 | Okubo et al. |
| 2013/0039284 A1* | 2/2013 | Marinier ................ H04L 5/001 370/329 |
| 2014/0092821 A1* | 4/2014 | Zhu ................... H04W 52/0258 370/329 |
| 2015/0092690 A1* | 4/2015 | Seo ..................... H04W 72/042 370/329 |
| 2016/0241376 A1 | 8/2016 | Gauvreau et al. |

FOREIGN PATENT DOCUMENTS

| | | |
|---|---|---|
| CN | 102325378 A | 1/2012 |
| CN | 102378269 A | 3/2012 |
| CN | 102415038 A | 4/2012 |
| EP | 2 582 073 A2 | 4/2013 |
| EP | 2 584 725 A2 | 4/2013 |
| EP | 2 728 775 A2 | 5/2014 |
| RU | 2011121817 A | 12/2012 |
| WO | WO 2011/155708 A2 | 12/2011 |
| WO | WO 2011/159111 A2 | 12/2011 |
| WO | WO 2013/002573 A2 | 1/2013 |

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.1.0, Dec. 2012, 160 pages.

"3rd Generation Partnership Project; Technical Specification Group Radio Access Network; Evolved Universal Terrestrial Radio Access (E-UTRA); Physical Channels and Modulation (Release 11)", 3GPP TS 36.211 V11.1.0, Dec. 2012, 108 pages.

* cited by examiner

Determine the EPDCCH resource set p in a subframe k, where the EPDCCH resource set p includes q resource block pairs, each of the resource block pairs corresponds to r enhanced control channel elements ECCEs, $q>=1$, $r>=1$, $N_{ECCE,p,k}=q\times r$ indicates the number of ECCEs in the EPDCCH resource set p, reference numerals of the $N_{ECCE,p,k}$ ECCEs are 0, 1, 2, ..., $N_{ECCE,p,k}-1$ respectively, an EPDCCH candidate of an EPDCCH at the aggregation level L corresponds to L ECCEs having consecutive reference numerals, and an EPDCCH candidate is capable of carrying an EPDCCH / 101

Determine the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex / 102

FIG. 1

201 — A base station determines the EPDCCH resource set p in a subframe k, where the EPDCCH resource set p includes q resource block pairs, each of the resource block pairs corresponds to r enhanced control channel elements ECCEs, $q \geq 1$, $r \geq 1$, $N_{ECCE,p,k} = q \times r$ indicates the number of ECCEs in the EPDCCH resource set p, reference numerals of the $N_{ECCE,p,k}$ ECCEs are 0, 1, 2, ..., $N_{ECCE,p,k}-1$ respectively, an EPDCCH candidate of an EPDCCH at the aggregation level L corresponds to L ECCEs having consecutive reference numerals, and an EPDCCH candidate is capable of carrying an EPDCCH 202 — The base station determines the number of EPDCCH candidates at the aggregation level L of a carrier corresponding to an index Cellindex and an ECCE corresponding to each EPDCCH candidate, where the ECCE corresponding to each EPDCCH candidate at the aggregation level L is dependent on the index Cellindex 203 — The base station places a to-be-transmitted EPDCCH of the carrier corresponding to the index Cellindex in an EPDCCH candidate among multiple determined EPDCCH candidates, and sends the EPDCCH 204 — The UE determines the EPDCCH resource set p in the subframe k, where the EPDCCH resource set p includes q resource block pairs, each of the resource block pairs corresponds to r enhanced control channel elements ECCEs, $q \geq 1$, $r \geq 1$, $N_{ECCE,p,k} = q \times r$ indicates the number of ECCEs in the EPDCCH resource set p, reference numerals of the $N_{ECCE,p,k}$ ECCEs are 0, 1, 2, ..., $N_{ECCE,p,k}-1$ respectively, an EPDCCH candidate of the EPDCCH at the aggregation level L corresponds to L ECCEs having consecutive reference numerals, and an EPDCCH candidate is capable of carrying an EPDCCH 205 — The UE determines the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex 206 — The UE detects the determined EPDCCH candidate corresponding to the aggregation level L of the carrier corresponding to the index Cellindex; when a correct EPDCCH is detected, the UE obtains control information of the carrier corresponding to the index Cellindex from the correct EPDCCH by means of parsing; and when no correct EPDCCH is detected, by using another aggregation level, the UE continues to determine the EPDCCH candidate corresponding to the aggregation level L of the carrier corresponding to the index Cellindex and performs detection until a correct EPDCCH is detected or the $q \times r$ ECCEs are traversed

FIG. 2

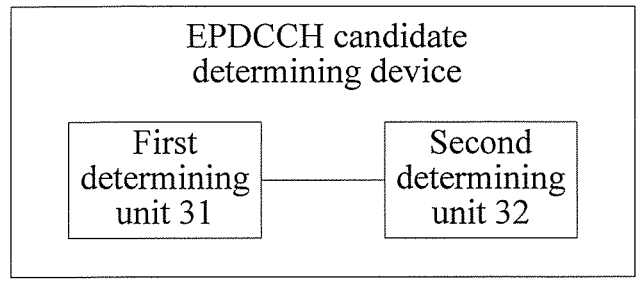

FIG. 3

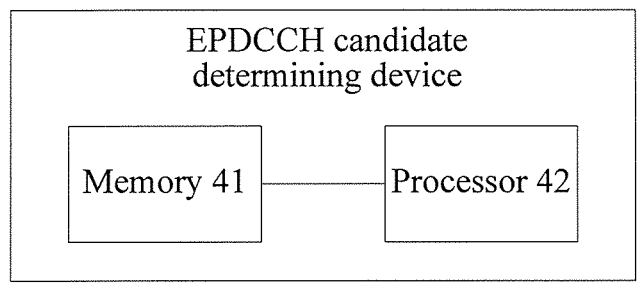

FIG. 4

| Configure, by using higher layer signaling, or determine, according to a predetermined rule, the number N of physical resources occupied by an ECSS | 501 |

| Determine locations of the physical resources occupied by the ECSS, where the locations of the physical resources occupied by the ECSS are predefined locations related to at least one of a physical cell ID, a virtual cell ID, a subframe timeslot number, and a system bandwidth, or random locations related to at least one of a physical or virtual cell ID, a subframe timeslot number, and a system bandwidth | 502 |

FIG. 5

EPDCCH CANDIDATE DETERMINING METHOD AND DEVICE

CROSS-REFERENCE TO RELATED APPLICATIONS

This application is a continuation of International Application No. PCT/CN2013/070731, filed on Jan. 18, 2013, which is hereby incorporated by reference in its entirety.

TECHNICAL FIELD

The present invention relates to the field of wireless communications, and in particular, to an enhanced physical downlink control channel (Enhanced Physical Downlink Control Channel, EPDCCH) candidate determining method and device.

BACKGROUND

In a wireless communications system, a base station may carry an EPDCCH in a specific transmission resource, and send control information related to a carrier to a UE by sending the EPDCCH; correspondingly, the UE may also find the EPDCCH in the specific transmission resource, so as to obtain related configuration information of the carrier from the found EPDCCH by means of parsing.

Specifically, a base station determines an available EPDCCH resource set in a subframe, determines, according to an aggregation level of a to-be-transmitted EPDCCH and from the EPDCCH resource set, the number of and an allocation manner of candidates corresponding to the transmission of the aggregation level, places the to-be-transmitted EPDCCH in any candidate and sends the to-be-transmitted EPDCCH to a UE. Correspondingly, after obtaining information of the EPDCCH resource set, the UE may also determine, according to the same manner, the number of and an allocation manner of candidates corresponding to each aggregation level, and the UE may attempt to detect candidates of different aggregation levels separately, so as to obtain related control information of a carrier from a detected correct EPDCCH.

During implementation of the foregoing EPDCCH transmission, the inventor finds that the prior art has at least the following problems: when EPDCCHs of multiple carriers are sent in an EPDCCH resource set at the same time, an allocation manner of candidates for carrying the EPDCCHs is determined for each carrier by using a same algorithm, and therefore, distribution locations of EPDCCH candidates of any two carriers at the same aggregation level are completely the same, but an EPDCCH candidate can only carry one EPDCCH; as a result, some EPDCCHs at the same aggregation level are discarded, resulting in problems of EPDCCH blocking and unreliable transmission of control information.

SUMMARY

Embodiments of the present invention provide an EPDCCH transmission method and device, so as to avoid EPDCCH blocking and improve reliability of control information transmission.

In order to achieve the foregoing objectives, the embodiments of the present invention adopt the following technical solutions:

A first aspect of the present invention provides an enhanced physical downlink control channel EPDCCH candidate determining method, which is used in a cross-carrier scheduling process, where an EPDCCH candidate on at least two carriers is located in an EPDCCH resource set on one carrier among the at least two carriers, an aggregation level of the EPDCCH is L, and L>=1. The method includes:

determining the EPDCCH resource set p in a subframe k, where the EPDCCH resource set p includes q resource block pairs, each of the resource block pairs corresponds to r enhanced control channel elements ECCEs, q>=1, r>=1, $N_{ECCE,p,k}=q \times r$ indicates the number of ECCEs in the EPDCCH resource set p, reference numerals of the $N_{ECCE,p,k}$ ECCEs are $0, 1, \ldots, N_{ECCE,p,k}-1$ respectively, an EPDCCH candidate of the EPDCCH at the aggregation level L corresponds to L ECCEs having consecutive reference numerals, and an EPDCCH candidate is capable of carrying an EPDCCH; and determining the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

With reference to the first aspect of the present invention, in a first possible implementation manner, the determining the number of EPDCCH candidates at the aggregation level L of a carrier corresponding to an index Cellindex and an ECCE corresponding to each EPDCCH candidate includes obtaining an ECCE corresponding to an $m^{th}$ EPDCCH candidate according to the following formula:

$$L\left\{\left(Y_{p,k} + \left\lfloor \frac{m \square N_{ECCE,p,k}}{L \square M_p^{(L)}} \right\rfloor + n_{Cellindex}\right) \bmod \lfloor N_{ECCE,p,k}/L \rfloor\right\} + i$$

where $Y_{p,k}$ is a random value related to subframe number k and the EPDCCH resource set p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, and $n_{Cellindex}$ is a predefined candidate offset of the carrier corresponding to the index Cellindex.

With reference to the first aspect of the present invention, in a second possible implementation manner, the determining the number of EPDCCH candidates at the aggregation level L of a carrier corresponding to an index Cellindex and an ECCE corresponding to each EPDCCH candidate includes obtaining an ECCE corresponding to an $m^{th}$ EPDCCH candidate according to the following formula:

$$L\left\{\left(Y_{p,k} + \left\lfloor \frac{m \square N_{ECCE,p,k}}{L \square M_p^{(L)}} \right\rfloor + n_{Cellindex} \left\lfloor \frac{N_{ECCE,p,k}}{L \square M_p^{(L)} \square n} \right\rfloor\right) \bmod \lfloor N_{ECCE,p,k}/L \rfloor\right\} + i$$

where $Y_{p,k}$ is a random value related to subframe number k and EPDCCH set index p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, and n is the number of carriers.

With reference to the first aspect of the present invention, in a third possible implementation manner, the determining the number of EPDCCH candidates at the aggregation level L of a carrier corresponding to an index Cellindex and an ECCE corresponding to each EPDCCH candidate includes obtaining an ECCE corresponding to an $m^{th}$ EPDCCH candidate according to the following formula:

$$L\left\{\left(Y_{p,k} + \left\lfloor\frac{m' \cdot N_{ECCE,p,k}}{L \cdot M_p^{(L)} \cdot n}\right\rfloor\right) \bmod \lfloor N_{ECCE,p,k}/L\rfloor\right\} + i$$

where $Y_{p,k}$ is a random value related to subframe number k and EPDCCH set index p, p and k are both integers, $M_p^{(L)}$ is the number of EPDCCH candidates, of a user equipment UE corresponding to the EPDCCH candidate, corresponding to the aggregation level L of the EPDCCH resource set p, $0 \leq i \leq L-1$, $0 \leq m \leq M_p^{(L)}-1$, $m'=m \cdot n + n_{Cellindex}$ and n is the number of carriers.

With reference to the first aspect of the present invention, the second possible implementation manner, or the third possible implementation manner, in a fourth possible implementation manner, n is the number Q of carriers of the user equipment, or n is the number of schedulable carriers of the user equipment in the EPDCCH set p, including carriers activated and deactivated in the EPDCCH set p by the user equipment in the subframe k.

With reference to the first possible implementation manner, the second possible implementation manner, the third possible implementation manner, or the fourth possible implementation manner of the first aspect of the present invention, in a fifth possible implementation manner, $n_{Cellindex}$ is a relative offset, which is related to the index Cellindex, of candidates having a same serial number between carriers; and a value range of $n_{Cellindex}$ is from 0 to the number D1 of carriers in carrier aggregation of the user equipment minus 1 or to the number D2 of schedulable carriers of the user equipment in the EPDCCH set minus 1, and the D2 schedulable carriers includes carriers activated and deactivated in the EPDCCH set p by the user equipment in the subframe k.

With reference to the first possible implementation manner, the second possible implementation manner, the third possible implementation manner, the fourth possible implementation manner, or the fifth possible implementation manner of the first aspect of the present invention, in a sixth possible implementation manner, according to ascending order or descending order of the indexes Cellindex of the carriers, a first serial number sequence, which is sequentially numbered, is obtained starting from 0, and $n_{Cellindex}$ is a serial number value of the carrier index Cellindex in the first serial number sequence.

With reference to the first possible implementation manner, the second possible implementation manner, the third possible implementation manner, or the fourth possible implementation manner of the first aspect of the present invention, in a seventh possible implementation manner, $n_{Cellindex}$ is a value of the index Cellindex.

A second aspect of the present invention provides an enhanced physical downlink control channel EPDCCH candidate determining device, which is used in a cross-carrier scheduling process, where an EPDCCH candidate on at least two carriers is located in an EPDCCH resource set on one carrier among the at least two carriers, an aggregation level of the EPDCCH is L, and L>=1. The device includes:

a first determining unit, configured to determine an EPDCCH resource set p in a subframe k, where the EPDCCH resource set p includes q resource block pairs, each of the resource block pairs corresponds to r enhanced control channel elements ECCEs, $q \geq 1$, $r \geq 1$, $N_{ECCE,p,k} = q \times r$ indicates the number of ECCEs in the EPDCCH resource set p, reference numerals of the $N_{ECCE,p,k}$ ECCEs are 0, 1, 2, . . . , $N_{ECCE,p,k}-1$ respectively, an EPDCCH candidate of the EPDCCH at the aggregation level L corresponds to L ECCEs having consecutive reference numerals, and an EPDCCH candidate is capable of carrying an EPDCCH; and a second determining unit, configured to determine the number of EPDCCH candidates at the aggregation level L of a carrier corresponding to an index Cellindex and an ECCE corresponding to each EPDCCH candidate in the EPDCCH resource set p determined by the first determining unit, where the ECCE corresponding to each EPDCCH candidate at the aggregation level L is related to the index Cellindex.

With reference to the second aspect of the present invention, in a first possible implementation manner, the second determining unit is further configured to obtain an ECCE corresponding to an $m^{th}$ EPDCCH candidate according to the following formula:

$$L\left\{\left(Y_{p,k} + \left\lfloor\frac{m \cdot N_{ECCE,p,k}}{L \cdot M_p^{(L)}}\right\rfloor + n_{Cellindex}\right) \bmod \lfloor N_{ECCE,p,k}/L\rfloor\right\} + i$$

where $Y_{p,k}$ is a random value related to subframe number k and the EPDCCH resource set p, p and k are both integers, $M_p^{(L)}$ is the number of EPDCCH candidates, of a user equipment UE corresponding to the EPDCCH candidate, corresponding to the aggregation level L of the EPDCCH resource set p, $0 \leq i \leq L-1$, $0 \leq M \leq M_p^{(L)}-1$, and $n_{Cellindex}$ is a predefined candidate offset of the carrier corresponding to the index Cellindex.

With reference to the second aspect of the present invention, in a second possible implementation manner, the second determining unit is further configured to obtain an ECCE corresponding to an $m^{th}$ EPDCCH candidate according to the following formula:

$$L\left\{\left(Y_{p,k} + \left\lfloor\frac{m \cdot N_{ECCE,p,k}}{L \cdot M_p^{(L)}}\right\rfloor + n_{Cellindex} \left\lfloor\frac{N_{ECCE,p,k}}{L \cdot M_p^{(L)} \cdot n}\right\rfloor\right) \bmod \lfloor N_{ECCE,p,k}/L\rfloor\right\} + i$$

where $Y_{p,k}$ is a random value related to subframe number k and EPDCCH set index p, p and k are both integers, $M_p^{(L)}$ is the number of EPDCCH candidates, of a user equipment UE corresponding to the EPDCCH candidate, corresponding to the aggregation level L of the EPDCCH resource set p, $0 \leq i \leq L-1$, $0 \leq m \leq M_p^{(L)}-1$, and n is the number of carriers.

With reference to the second aspect of the present invention, in a third possible implementation manner, the second determining unit is further configured to obtain an ECCE corresponding to an $m^{th}$ EPDCCH candidate according to the following formula:

$$L\left\{\left(Y_{p,k} + \left\lfloor\frac{m' \cdot N_{ECCE,p,k}}{L \cdot M_p^{(L)} \cdot n}\right\rfloor\right) \bmod \lfloor N_{ECCE,p,k}/L\rfloor\right\} + i$$

where $Y_{p,k}$ is a random value related to subframe number k and EPDCCH set index p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, $m'=m\cdot n+n_{Cellindex}$, and n is the number of carriers.

With reference to the second and third possible implementation manners of the second aspect of the present invention, in a fourth possible implementation manner, n is the number Q of carriers of the user equipment, or n is the number of schedulable carriers of the user equipment in the EPDCCH set p, including carriers activated and deactivated in the EPDCCH set p by the user equipment in the subframe k.

With reference to the first possible implementation manner, the second possible implementation manner, the third possible implementation manner, or the fourth possible implementation manner of the second aspect of the present invention, in a fifth possible implementation manner, $n_{Cellindex}$ is a relative offset, which is related to the index Cellindex, of candidates having a same serial number between carriers; and a value range of $n_{Cellindex}$ is from 0 to the number D1 of carriers in carrier aggregation of the user equipment minus 1 or to the number D2 of schedulable carriers of the user equipment in the EPDCCH set minus 1, and the D2 schedulable carriers includes carriers activated and deactivated in the EPDCCH set p by the user equipment in the subframe k.

With reference to the first possible implementation manner, the second possible implementation manner, the third possible implementation manner, the fourth possible implementation manner, or the fifth possible implementation manner of the second aspect of the present invention, in a sixth possible implementation manner, according to ascending order or descending order of the indexes Cellindex of the carriers, a first serial number sequence, which is sequentially numbered, is obtained starting from 0, and $n_{Cellindex}$ is a serial number value of the carrier index Cellindex in the first serial number sequence.

With reference to the first possible implementation manner, the second possible implementation manner, the third possible implementation manner, or the fourth possible implementation manner of the second aspect of the present invention, in a seventh possible implementation manner, $n_{Cellindex}$ is a value of the index Cellindex.

A third aspect of the present invention provides an enhanced physical downlink control channel EPDCCH candidate determining device, which is used in a cross-carrier scheduling process, where an EPDCCH candidate on at least two carriers is located in an EPDCCH resource set on one carrier among the at least two carriers, an aggregation level of the EPDCCH is L, and $L>=1$. The device includes:

a memory, configured to store program code used to determine an EPDCCH candidate; and a processor, configured to read and run the program code stored in the memory, where the program code is used to execute the following operations: determining the EPDCCH resource set p in a subframe k, where the EPDCCH resource set p includes q resource block pairs, each of the resource block pairs corresponds to r enhanced control channel elements ECCEs, $q>=1$, $r>=1$, $N_{ECCE,p,k}=q\times r$ indicates the number of ECCEs in the EPDCCH resource set p, reference numerals of the $N_{ECCE,p,k}$ ECCEs are 0, 1, 2, ..., $N_{ECCE,p,k}-1$ respectively, an EPDCCH candidate of the EPDCCH at the aggregation level L corresponds to L ECCEs having consecutive reference numerals, and an EPDCCH candidate is capable of carrying an EPDCCH;

determining the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

With reference to the third aspect of the present invention, in a first possible implementation manner, the determining the number of EPDCCH candidates at the aggregation level L of a carrier corresponding to an index Cellindex and an ECCE corresponding to each EPDCCH candidate includes obtaining an ECCE corresponding to an $m^{th}$ EPDCCH candidate according to the following formula:

$$L\left\{\left(Y_{p,k} + \left\lfloor\frac{m\square N_{ECCE,p,k}}{L\square M_p^{(L)}}\right\rfloor + n_{Cellindex}\right) \bmod \lfloor N_{ECCE,p,k}/L\rfloor\right\} + i$$

where $Y_{p,k}$ is a random value related to subframe number k and the EPDCCH resource set p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, and $n_{Cellindex}$ is a predefined candidate offset of the carrier corresponding to the index Cellindex.

With reference to the third aspect of the present invention, in a second possible implementation manner, the determining the number of EPDCCH candidates at the aggregation level L of a carrier corresponding to an index Cellindex and an ECCE corresponding to each EPDCCH candidate includes obtaining an ECCE corresponding to an $m^{th}$ EPDCCH candidate according to the following formula:

$$L\left\{\left(Y_{p,k} + \left\lfloor\frac{m\square N_{ECCE,p,k}}{L\square M_p^{(L)}}\right\rfloor + n_{Cellindex}\left\lfloor\frac{N_{ECCE,p,k}}{L\square M_p^{(L)}\square n}\right\rfloor\right) \bmod \lfloor N_{ECCE,p,k}/L\rfloor\right\} + i$$

where $Y_{p,k}$ is a random value related to subframe number k and EPDCCH set index p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, and n is the number of carriers.

With reference to the third aspect of the present invention, in a third possible implementation manner, the determining the number of EPDCCH candidates at the aggregation level L of a carrier corresponding to an index Cellindex and an ECCE corresponding to each EPDCCH candidate includes obtaining an ECCE corresponding to an $m^{th}$ EPDCCH candidate according to the following formula:

$$L\left\{\left(Y_{p,k} + \left\lfloor\frac{m'\square N_{ECCE,p,k}}{L\square M_p^{(L)}\square n}\right\rfloor\right) \bmod \lfloor N_{ECCE,p,k}/L\rfloor\right\} + i$$

where $Y_{p,k}$ is a random value related to subframe number k and EPDCCH set index p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, $m'=m\cdot n+n_{Cellindex}$, and n is the number of carriers.

With reference to the second possible implementation manner or the third possible implementation manner of the third aspect of the present invention, in a fourth possible implementation manner, n is the number Q of carriers of the user equipment, or n is the number of schedulable carriers of the user equipment in the EPDCCH set p, including carriers activated and deactivated in the EPDCCH set p by the user equipment in the subframe k.

With reference to the second possible implementation manner, the third possible implementation manner, or the fourth possible implementation manner of the third aspect of the present invention, in a fifth possible implementation manner, $n_{Cellindex}$ is a relative offset, which is related to the index Cellindex, of candidates having a same serial number between carriers; and a value range of $n_{Cellindex}$ is from 0 to the number D1 of carriers in carrier aggregation of the user equipment minus 1 or to the number D2 of schedulable carriers of the user equipment in the EPDCCH set minus 1, and the D2 schedulable carriers includes carriers activated and deactivated in the EPDCCH set p by the user equipment in the subframe k.

With reference to the second possible implementation manner, the third possible implementation manner, the fourth possible implementation manner, or the fifth possible implementation manner of the third aspect of the present invention, in a sixth possible implementation manner, according to ascending order or descending order of the indexes Cellindex of the carriers, a first serial number sequence, which is sequentially numbered, is obtained starting from 0, and $n_{Cellindex}$ is a serial number value of the carrier index Cellindex in the first serial number sequence.

With reference to the second possible implementation manner, the third possible implementation manner, or the fourth possible implementation manner of the third aspect of the present invention, in a seventh possible implementation manner, $n_{Cellindex}$ is a value of the index Cellindex.

A fourth aspect of the present invention provides a base station, which is used in a cross-carrier scheduling process, where an EPDCCH candidate on at least two carriers is located in an EPDCCH resource set on one carrier among the at least two carriers, an aggregation level of the EPDCCH is L, and L>=1. The base station includes: an EPDCCH candidate determining device and a sending device.

The EPDCCH candidate determining device is configured to determine the EPDCCH resource set p in a subframe k, where the EPDCCH resource set p includes q resource block pairs, each of the resource block pairs corresponds to r enhanced control channel elements ECCEs, q>=1, r>=1, $N_{ECCE,p,k}$=q×r indicates the number of ECCEs in the EPDCCH resource set p, reference numerals of the $N_{ECCE,p,k}$ ECCEs are 0, 1, 2, . . . , $N_{ECCE,p,k}$−1 respectively, an EPDCCH candidate of the EPDCCH at the aggregation level L corresponds to L ECCEs having consecutive reference numerals, and an EPDCCH candidate is capable of carrying an EPDCCH; and determine the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

The sending device is configured to place an EPDCCH of a carrier, whose index Cellindex is a carrier indicator field index Cellindex, in one EPDCCH candidate among EPDCCH candidates determined by the EPDCCH candidate determining device, and send the EPDCCH.

A fifth aspect of the present invention provides a user equipment UE, which is used in a cross-carrier scheduling process, where an EPDCCH candidate on at least two carriers is located in an EPDCCH resource set on one carrier among the at least two carriers, an aggregation level of the EPDCCH is L, and L>=1. The UE includes an EPDCCH candidate determining device and a receiving device.

The EPDCCH candidate determining device is configured to determine the EPDCCH resource set p in a subframe k, where the EPDCCH resource set p includes q resource block pairs, each of the resource block pairs corresponds to r enhanced control channel elements ECCEs, q>=1, r>=1, $N_{ECCE,p,k}$=q×r indicates the number of ECCEs in the EPDCCH resource set p, reference numerals of the $N_{ECCE,p,k}$ ECCEs are 0, 1, 2, . . . , $N_{ECCE,p,k}$−1 respectively, an EPDCCH candidate of the EPDCCH at the aggregation level L corresponds to L ECCEs having consecutive reference numerals, and an EPDCCH candidate is capable of carrying an EPDCCH; and determine the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

The receiving device is configured to detect the EPDCCH candidate determined by the EPDCCH candidate determining device; when a correct EPDCCH is detected, obtain control information of the carrier, whose index Cellindex is a carrier indicator field index Cellindex, from the correct EPDCCH by means of parsing; and when no correct EPDCCH is detected, instruct the EPDCCH candidate determining device to continue to determine, by using another aggregation level, the number of EPDCCH candidates at the another aggregation level of the carrier corresponding to the index Cellindex and an ECCE corresponding to each EPDCCH candidate until a correct EPDCCH is detected or the q×r ECCEs are traversed.

A sixth aspect of the present invention provides an enhanced common search space ECSS resource determining method, including:

configuring, by using higher layer signaling, or determining, according to a predetermined rule, the number N of physical resources occupied by an ECSS; and determining locations of the physical resources occupied by the ECSS, where the locations of the physical resources occupied by the ECSS are predefined locations related to at least one of a physical or virtual cell ID, a subframe timeslot number, and a system bandwidth, or random locations related to at least one of a physical or virtual cell ID, a subframe timeslot number, and a system bandwidth.

With reference to the sixth aspect of the present invention, in a first possible implementation manner, the determining, according to a predetermined rule, the number N of physical resources occupied by the ECSS includes that:

the number N of the physical resources occupied by the ECSS is related to the system bandwidth.

With reference to the sixth aspect of the present invention, in a second possible implementation manner, the locations of the physical resources occupied by the ECSS being predefined locations related to at least one of a physical cell ID, a virtual cell ID, a subframe timeslot number, and a system bandwidth includes that:

a fixed deviation exists between physical resource blocks occupied by an ECSS of each cell, and under different subframe timeslot numbers or different physical or virtual cell IDs, physical resource blocks occupied by an ECSS are different.

With reference to the second possible implementation manner of the sixth aspect of the present invention, in a third possible implementation manner, the locations of the physical resources occupied by the ECSS are:

$$Y_{k,i}=(Y_{k-1,0}+X) \bmod N_{RB}+(\lfloor N_{RB}/N \rfloor)*i$$

where $Y_{k-1,0}$ is a serial number of a first physical resource block pair occupied by an ECSS of a $(k-1)^{th}$ subframe, $Y_{-1,0}$ is a predefined value being the same for all cells, X is a virtual cell ID, N is the number of physical resource blocks occupied by the ECSS, i=0, 1, . . . , N−1, and $N_{RB}$ is the system bandwidth.

With reference to the second possible implementation manner of the sixth aspect of the present invention, in a fourth possible implementation manner, the locations of the physical resources occupied by the ECSS are:

$$Y_{k,i}=(Y_{k-1,i}+\text{offset}) \bmod N_{RB}$$

where $Y_{k-1,i}$ is a serial number of an $i^{th}$ physical resource block pair occupied by an ECSS of a $(k-1)^{th}$ subframe, offset may be a virtual cell ID or a subframe timeslot number, N is the number of physical resource blocks occupied by the ECSS, i=0, 1, . . . , N−1, and $N_{RB}$ is the system bandwidth.

With reference to the sixth aspect of the present invention, in a fifth possible implementation manner, the physical resources occupied by the ECSS being random locations related to at least one of a physical or virtual cell ID, a subframe timeslot number, and a system bandwidth includes that:

each physical resource occupied by the ECSS is randomly generated;

alternatively, a first physical resource occupied by the ECSS is randomly generated.

With reference to the fifth possible implementation manner of the sixth aspect of the present invention, in a sixth possible implementation manner, the locations of the physical resources occupied by the ECSS are:

$$Y_{k,i}=((A_i \cdot Y_{k-1,i}) \bmod D_i) \bmod N_{RB}$$

where $Y_{-1,i}=X$, $A_i=A+i*\text{offset}$, A=39827, $D_i=D+i*\text{offset}$, D=65537, $k=\lfloor n_s/2 \rfloor$, $n_s$ is a number of a timeslot in a subframe, X is a virtual cell ID, N is the number of physical resource blocks occupied by the ECSS, i=0, 1, . . . , N−1, and $N_{RB}$ is the system bandwidth.

With reference to the fifth possible implementation manner of the sixth aspect of the present invention, in a seventh possible implementation manner, the first physical resource occupied by the ECSS is:

$$Y_k=((A \cdot Y_{k-1}) \bmod D) \bmod N_{RB}$$

where $Y_{-1}=X$, X is a virtual cell ID, A=39827, D=65537, $k=\lfloor n_s/2 \rfloor$, $n_s$ is a number of a timeslot in a subframe, other physical resources occupied by the ECSS are: $(Y_k+\lfloor N_{RB}/N \rfloor \cdot i) \bmod N_{RB}$, N is the number of physical resource blocks occupied by the ECSS, i=0, 1, . . . , N−1, and $N_{RB}$ is the system bandwidth.

With reference to the sixth aspect of the present invention, in an eighth possible implementation manner, the physical resources occupied by the ECSS being random locations related to at least one of a physical or virtual cell ID, a subframe timeslot number, and a system bandwidth includes that:

the whole system bandwidth is divided into N groups of predefined resources not overlapping with each other, and physical resources occupied by the ECSS of different cells in different subframes are a random group, determined by a random function and related to at least one of the physical or virtual cell ID, the subframe timeslot number, and the system bandwidth, among the resource groups.

With reference to the eighth possible implementation manner of the sixth aspect of the present invention, in a ninth possible implementation manner, the random function is a hash (Hash) function.

A seventh aspect of the present invention provides an ECSS resource determining device, including:

a third determining unit, adapted to configure, by using higher layer signaling, or determine, according to a predetermined rule, the number N of physical resources occupied by the ECSS; and a fourth determining unit, configured to determine, according to the number N, determined by the third determining unit, of physical resources occupied by the ECSS, locations of the physical resources occupied by the ECSS, where the locations of the physical resources occupied by the ECSS are predefined locations related to at least one of a physical or virtual cell ID, a subframe timeslot number, and a system bandwidth, or random locations related to at least one of a physical or virtual cell ID, a subframe timeslot number, and a system bandwidth.

With reference to the seventh aspect of the present invention, in a first possible implementation manner, the number N of the physical resources occupied by the ECSS is related to the system bandwidth.

With reference to the seventh aspect of the present invention, in a second possible implementation manner, the locations of the physical resources occupied by the ECSS being predefined locations related to at least one of a physical cell ID, a virtual cell ID, a subframe timeslot number, and a system bandwidth includes that:

a fixed deviation exists between physical resource blocks occupied by an ECSS of each cell, and under different subframe timeslot numbers or different physical or virtual cell IDs, physical resource blocks occupied by an ECSS are different.

With reference to the second possible implementation manner of the seventh aspect of the present invention, in a third possible implementation manner, the locations, determined by the fourth determining unit, of the physical resources occupied by the ECSS are:

$$Y_{k,i}=(Y_{k-1,0}+X) \bmod N_{RB}+(\lfloor N_{RB}/N \rfloor)*i$$

where $Y_{k-1,0}$ is a serial number of a first physical resource block pair occupied by an ECSS of a $(k-1)^{th}$ subframe, $Y_{-1,0}$ is a predefined value being the same for all cells, X is a virtual cell ID, N is the number of physical resource blocks occupied by the ECSS, i=0, 1, . . . , N−1, and $N_{RB}$ is the system bandwidth.

With reference to the second possible implementation manner of the seventh aspect of the present invention, in a fourth possible implementation manner, the locations, determined by the fourth determining unit, of the physical resources occupied by the ECSS are:

$$Y_{k,i}=(Y_{k-1,i}+\text{offset}) \bmod N_{RB}$$

where $Y_{k-1,i}$ is a serial number of an $i^{th}$ physical resource block pair occupied by an ECSS of a $(k-1)^{th}$ subframe, offset may be a virtual cell ID or a subframe timeslot number, N is the number of physical resource blocks occupied by the ECSS, i=0, 1, . . . , N−1, and $N_{RB}$ is the system bandwidth.

With reference to the seventh aspect of the present invention, in a fifth possible implementation manner, the physical resources occupied by the ECSS being random locations related to at least one of a physical or virtual cell ID, a subframe timeslot number, and a system bandwidth includes that:

each physical resource occupied by the ECSS is randomly generated;

alternatively, a first physical resource occupied by the ECSS is randomly generated.

With reference to the fifth possible implementation manner of the seventh aspect of the present invention, in a sixth possible implementation manner, the locations, determined by the fourth determining unit, of the physical resources occupied by the ECSS are:

$$Y_{k,i}=((A_i \cdot Y_{k-1,i}) \bmod D_i) \bmod N_{RB}$$

where $Y_{-1,i}=X$, $A_i=A+i^*\text{offset}$, $A=39827$, $D_i=D+i^*\text{offset}$, $D=65537$, $k=\lfloor n_s/2 \rfloor$, $n_s$ is a number of a timeslot in a subframe, X is a virtual cell ID, N is the number of physical resource blocks occupied by the ECSS, i=0, 1, ..., N−1, and $N_{RB}$ is the system bandwidth.

With reference to the fifth possible implementation manner of the seventh aspect of the present invention, in a seventh possible implementation manner, the first physical resource, determined by the fourth determining unit, occupied by the ECSS is:

$$Y_k=((A \cdot Y_{k-1}) \bmod D) \bmod N_{RB}$$

where $Y_{-1}=X$, X is a virtual cell ID, $A=39827$, $D=65537$, $k=\lfloor n_s/2 \rfloor$, $n_s$ is a number of a timeslot in a subframe, other physical resources occupied by the ECSS are: $(Y_k + \lfloor N_{RB}/N \rfloor \cdot i) \bmod N_{RB}$, N is the number of physical resource blocks occupied by the ECSS, i=0, 1, ..., N−1, and $N_{RB}$ is the system bandwidth.

With reference to the seventh aspect of the present invention, in an eighth possible implementation manner, the physical resources occupied by the ECSS being random locations related to at least one of a physical or virtual cell ID, a subframe timeslot number, and a system bandwidth includes that:

the whole system bandwidth is divided into N groups of predefined resources not overlapping with each other, and physical resources occupied by the ECSS of different cells in different subframes are a random group, determined by a random function and related to at least one of the physical or virtual cell ID, the subframe timeslot number, and the system bandwidth, among the resource groups.

With reference to the eighth possible implementation manner of the seventh aspect of the present invention, in a ninth possible implementation manner, the random function is a hash (Hash) function.

An eighth aspect of the present invention provides an enhanced common search space ECSS resource determining device, including:

a memory, configured to store program code used to determine an ECSS resource; and a processor, configured to read and run the program code stored in the memory, where the program code is used to execute the following operations: configuring, by using higher layer signaling, or determining, according to a predetermined rule, the number N of physical resources occupied by the ECSS; and determining locations of the physical resources occupied by the ECSS, where the locations of the physical resources occupied by the ECSS are predefined locations related to at least one of a physical or virtual cell ID, a subframe timeslot number, and a system bandwidth, or random locations related to at least one of a physical or virtual cell ID, a subframe timeslot number, and a system bandwidth.

With reference to the eighth aspect of the present invention, in a first possible implementation manner, the number N of the physical resources occupied by the ECSS is related to the system bandwidth.

With reference to the eighth aspect of the present invention, in a second possible implementation manner, the locations of the physical resources occupied by the ECSS being predefined locations related to at least one of a physical cell ID, a virtual cell ID, a subframe timeslot number, and a system bandwidth includes that:

a fixed deviation exists between physical resource blocks occupied by an ECSS of each cell, and under different subframe timeslot numbers or different physical or virtual cell IDs, physical resource blocks occupied by an ECSS are different.

With reference to the second possible implementation manner of the eighth aspect of the present invention, in a third possible implementation manner, the locations, determined by the processor, of the physical resources occupied by the ECSS are:

$$Y_{k,i}=(Y_{k-1,0}+X) \bmod N_{RB}+(\lfloor N_{RB}/N \rfloor)^*i$$

where $Y_{k-1,0}$ is a serial number of a first physical resource block pair occupied by an ECSS of a $(k-1)^{th}$ subframe, $Y_{-1,0}$ is a predefined value being the same for all cells, X is a virtual cell ID, N is the number of physical resource blocks occupied by the ECSS, i=0, 1, ..., N−1, and $N_{RB}$ is the system bandwidth.

With reference to the second possible implementation manner of the eighth aspect of the present invention, in a fourth possible implementation manner, the locations, determined by the processor, of the physical resources occupied by the ECSS are:

$$Y_{k,i}=(Y_{k-1,i}+\text{offset}) \bmod N_{RB}$$

where $Y_{k-1,i}$ is a serial number of an $i^{th}$ physical resource block pair occupied by an ECSS of a $(k-1)^{th}$ subframe, offset may be a virtual cell ID or a subframe timeslot number, N is the number of physical resource blocks occupied by the ECSS, i=0, 1, ..., N−1, and $N_{RB}$ is the system bandwidth.

With reference to the eighth aspect of the present invention, in a fifth possible implementation manner, the physical resources occupied by the ECSS being random locations related to at least one of a physical or virtual cell ID, a subframe timeslot number, and a system bandwidth includes that:

each physical resource occupied by the ECSS is randomly generated;

alternatively, a first physical resource occupied by the ECSS is randomly generated.

With reference to the fifth possible implementation manner of the eighth aspect of the present invention, in a sixth possible implementation manner, the locations, determined by the processor, of the physical resources occupied by the ECSS are:

$$Y_{k,i}=((A_i \cdot Y_{k-1,i}) \bmod D_i) \bmod N_{RB}$$

where $Y_{-1,i}=X$, $A_i=A+i^*\text{offset}$, $A=39827$, $D_i=D+i^*\text{offset}$, $D=65537$, $k=\lfloor n_s/2 \rfloor$, $n_s$ is a number of a timeslot in a subframe, X is a virtual cell ID, N is the number of physical resource blocks occupied by the ECSS, i=0, 1, ..., N−1, and $N_{RB}$ is the system bandwidth.

With reference to the fifth possible implementation manner of the eighth aspect of the present invention, in a seventh possible implementation manner, the first physical resource, determined by the processor, occupied by the ECSS is:

$$Y_k=((A \cdot Y_{k-1}) \bmod D) \bmod N_{RB}$$

where $Y_{-1}=X$, X is a virtual cell ID, A=39827, D=65537, $k=\lfloor n_s/2 \rfloor$, $n_s$ is a number of a timeslot in a subframe, other physical resources occupied by the ECSS are: $(Y_k+\lfloor N_{RB}/N \rfloor \cdot i) \bmod N_{RB}$, N is the number of physical resource blocks occupied by the ECSS, i=0, 1, . . . , N−1, and $N_{RB}$ is the system bandwidth.

With reference to the eighth aspect of the present invention, in an eighth possible implementation manner, the physical resources occupied by the ECSS being random locations related to at least one of a physical or virtual cell ID, a subframe timeslot number, and a system bandwidth includes that:

the whole system bandwidth is divided into N groups of predefined resources not overlapping with each other, and physical resources occupied by the ECSS of different cells in different subframes are a random group, determined by a random function and related to at least one of the physical or virtual cell ID, the subframe timeslot number, and the system bandwidth, among the resource groups.

With reference to the eighth possible implementation manner of the eighth aspect of the present invention, in a ninth possible implementation manner, the random function is a hash (Hash) function.

A ninth aspect of the present invention provides a base station, which is used in a cross-carrier scheduling process, where an EPDCCH candidate on at least two carriers is located in an EPDCCH resource set on one carrier among the at least two carriers, an aggregation level of the EPDCCH is L, and L>=1. The base station includes: an ECSS resource determining device and a sending device.

The EPDCCH candidate determining device is configured to determine the EPDCCH resource set p in a subframe k, where the EPDCCH resource set p includes q resource block pairs, each of the resource block pairs corresponds to r enhanced control channel elements ECCEs, q>=1, r>=1, $N_{ECCE,p,k}=q \times r$ indicates the number of ECCEs in the EPDCCH resource set p, reference numerals of the $N_{ECCE,p,k}$ ECCEs are 0, 1, 2, . . . , $N_{ECCE,p,k}-1$ respectively, an EPDCCH candidate of the EPDCCH at the aggregation level L corresponds to L ECCEs having consecutive reference numerals, and an EPDCCH candidate is capable of carrying an EPDCCH; and determine the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

The sending device is configured to place the ECSS in a physical resource, determined by the ECSS resource determining device, occupied by the ECSS, and send a carrier in which the ECSS is placed.

A tenth aspect of the present invention provides a user equipment UE, which is used in a cross-carrier scheduling process, where an EPDCCH candidate on at least two carriers is located in an EPDCCH resource set on one carrier among the at least two carriers, an aggregation level of the EPDCCH is L, and L>=1. The UE includes an ECSS resource determining device and a receiving device.

The EPDCCH candidate determining device is configured to determine the EPDCCH resource set p in a subframe k, where the EPDCCH resource set p includes q resource block pairs, each of the resource block pairs corresponds to r enhanced control channel elements ECCEs, q>=1, r>=1, $N_{ECCE,p,k}=q \times r$ indicates the number of ECCEs in the EPDCCH resource set p, reference numerals of the $N_{ECCE,p,k}$ ECCEs are 0, 1, 2, . . . , $N_{ECCE,p,k}-1$ respectively, an EPDCCH candidate of the EPDCCH at the aggregation level L corresponds to L ECCEs having consecutive reference numerals, and an EPDCCH candidate is capable of carrying an EPDCCH; and determine the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

The receiving device is configured to detect the ECSS in a physical resource, determined by the ECSS resource determining device, occupied by the ECSS, and obtain common control information of a cell by means of parsing.

In the EPDCCH candidate determining method provided by the embodiment of the present invention, during determination of an EPDCCH candidate used to carry an EPDCCH, EPDCCH candidates of two carriers at the same aggregation level are spaced by a candidate offset; as compared with a technology in the prior art where EPDCCH candidates corresponding to carriers at the same aggregation level completely overlap, EPDCCH candidates of different carriers can be staggered, so that an EPDCCH of each carrier can be successfully placed in a corresponding EPDCCH candidate, so as to prevent some EPDCCHs from being discarded due to overlapping of the EPDCCH candidates, thereby avoiding EPDCCH blocking, and improving reliability of control information transmission.

BRIEF DESCRIPTION OF THE DRAWINGS

To describe the technical solutions in the embodiments of the present invention art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a flowchart of an EPDCCH candidate determining method in an embodiment of the present invention;

FIG. 2 is a flowchart of an EPDCCH candidate determining method in another embodiment of the present invention;

FIG. 3 is a schematic structural diagram of an EPDCCH candidate determining device in another embodiment of the present invention;

FIG. 4 is a schematic structural diagram of an EPDCCH candidate determining device in another embodiment of the present invention;

FIG. 5 is a flowchart of an ECSS resource determining method in another embodiment of the present invention;

DETAILED DESCRIPTION

Figure 6:
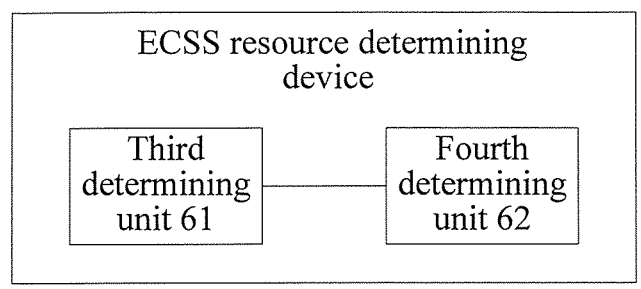
FIG. 6 is a schematic structural diagram of an ECSS resource determining device in another embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An embodiment of the present invention provides an EPDCCH candidate determining method, which is used in a cross-carrier scheduling process, where an EPDCCH candidate on at least two carriers is located in an EPDCCH resource set on one carrier among the at least two carriers, an aggregation level of the EPDCCH is L, and L>=1. As shown in FIG. 1, the method includes:

101: Determine the EPDCCH resource set p in a subframe k, where the EPDCCH resource set p includes q resource block pairs, each of the resource block pairs corresponds to r enhanced control channel elements ECCEs, q>=1, r>=1, $N_{ECCE,p,k}$=q×r indicates the number of ECCEs in the EPDCCH resource set p, reference numerals of the $N_{ECCE,p,k}$ ECCEs are 0, 1, 2, . . . , $N_{ECCE,p,k}$−1 respectively, an EPDCCH candidate of the EPDCCH at the aggregation level L corresponds to L ECCEs having consecutive reference numerals, and an EPDCCH candidate is capable of carrying an EPDCCH.

Some resource sets among wireless transmission resources may be used to transmit an EPDCCH, and a method for determining the EPDCCH resource set p that can be used to transmit the EPDCCH belongs to the prior art, and is not described in detail in the embodiment of the present invention. The EPDCCH resource set p may be formed by multiple resource block pairs. Specifically, in a subframe k, a pair of resource blocks (Resource Block, RB) of two timeslots is referred to as a resource block pair (RB pair, RB pair). During actual sending, a resource block pair used by a physical resource is also referred to as a physical resource block pair (Physical RB pair, PRB pair). According to different types of subframes, in a PRB pair, 2 or 4 enhanced control channel elements (Enhanced Control Channel Element, ECCE) may exist. Specifically, a PRB pair has 16 enhanced resource element groups (Enhanced Resource Element Group, EREG), and numerals of the 16 EREGs are 0, 1, 2 . . . 15. For a subframe with a normal cyclic prefix, 4 EREGs form an ECCE, an in this way, a PRB pair includes 4 ECCEs. For a subframe with an extended cyclic prefix, 8 EREGs form an ECCE, and therefore a PRB pair includes 2 ECCEs.

For example, as shown in Table 1, using an aggregation level 1 as an example, an EPDCCH of a carrier has 4 EPDCCH candidates, the EPDCCH resource set has 16 potential EPDCCH candidates, which are ECCE0, ECCE1, ECCE2 . . . ECCE15 respectively, and 4 EPDCCH candidates for transmitting the EPDCCH may be determined among the 16 potential EPDCCH candidates. The number of EPDCCH candidates depends on an aggregation level $L_t$ of a to-be-transmitted EPDCCH, and the numbers of EPDCCH candidates corresponding to different aggregation levels are different, for example, the numbers of candidates corresponding to aggregation levels 1, 2, 4, and 8 are 4, 6, 2, and 2.

2 (CA2) in an EPDCCH resource set is in Table 1. Aggregation levels of to-be-transmitted EPDCCHs of the two carriers are both $L_t$, and therefore it is determined in the prior art that the EPDCCH candidates of CA1 and the EPDCCH candidates of CA2 are distributed on same ECCEs, while an ECCE can only carry one PDCCH.

102: Determine the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

That the ECCE corresponding to each EPDCCH candidate at the aggregation level L is related to the index Cellindex indicates that the ECCE corresponding to each EPDCCH candidate may be calculated according to the index Cellindex and other related parameters, and a calculating method may be adjusted according to actual needs.

In a first implementation manner of this embodiment, the determining the number of EPDCCH candidates at the aggregation level L of a carrier corresponding to an index Cellindex and an ECCE corresponding to each EPDCCH candidate includes obtaining an ECCE corresponding to an $m^{th}$ EPDCCH candidate according to the following formula:

$$L\left\{\left(Y_{p,k} + \left\lfloor \frac{m \square N_{ECCE,p,k}}{L \square M_p^{(L)}} \right\rfloor + n_{Cellindex}\right) \bmod \lfloor N_{ECCE,p,k}/L \rfloor\right\} + i \quad \text{(Formula 1)}$$

where $Y_{p,k}$ is a random value related to subframe number k and the EPDCCH resource set p, p and k are both integers, $M_p^{(L)}$ is the number of EPDCCH candidates, of the UE, corresponding to the aggregation level L of the EPDCCH resource set p, 0<=i<=L−1, 0<=m<=$M_p^{(L)}$−1, and $n_{Cellindex}$ is a predefined candidate offset of the carrier corresponding to the index Cellindex.

For example, an example of $Y_{p,k}$ is:

$Y_{1,k} = Y_{0,k} + \text{offset}, Y_{0,k} = (A \cdot Y_{0,k}) \bmod D, Y_{0,-1} = n_{RNTI}$, where p=0 or 1; $n_{RNTI}$ is a radio network temporary identifier (RNTI, Radio Network Temporary Identifier) of the UE; offset is an integer, for example 3, and is an offset value of $Y_{p,k}$ of two EPDCCH sets; A=39827, D=65537, and k is the subframe number.

For example, another example of $Y_{p,k}$ is:

$Y_{p,k} = (A_p \cdot Y_{p,k-1}) \bmod D, A_0=39827, A_1=39829, Y_{p,-1}=n_{RNTI}, p=0$ or 1 where the parameters have the same meaning as the foregoing parameters. The foregoing methods for generating $Y_{p,k}$ are applicable to all the embodiments in this specification.

TABLE 1

|  | ECCE0 | ECCE1 | ECCE2 | ECCE3 | ECCE4 | ECCE5 | ECCE6 | ECCE7 | ECCE8 |
|---|---|---|---|---|---|---|---|---|---|
| Carrier 1 | Candidate 1 |  |  |  | Candidate 2 |  |  |  | Candidate 3 |
| Carrier 2 | Candidate 1 |  |  |  | Candidate 2 |  |  |  | Candidate 3 |

|  | ECCE9 | ECCE10 | ECCE11 | ECCE12 | ECCE13 | ECCE14 | ECCE15 |
|---|---|---|---|---|---|---|---|
| Carrier 1 |  |  |  | Candidate 4 |  |  |  |
| Carrier 2 |  |  |  | Candidate 4 |  |  |  |

Table 1 is a schematic diagram of EPDCCH candidate distribution of two carriers—a carrier 1 (CA1) and a carrier In this embodiment, $n_{Cellindex}$ may be a relative offset of candidates having a same serial number between carriers corresponding to the index Cellindex. A value range of $n_{Cellindex}$ may be from 0 to the number D1 of carriers in carrier aggregation of the user equipment minus 1 or to the number D2 of schedulable carriers of the user equipment in the EPDCCH set minus 1, where the schedulable carriers include carriers activated and deactivated in the EPDCCH set p by the user equipment in the subframe k.

In the first implementation manner, optionally, according to ascending order or descending order of the indexes Cellindex of the carriers, a first serial number sequence, which is sequentially numbered, is obtained starting from 0, and $n_{Cellindex}$ is a serial number value of the carrier index Cellindex in the first serial number sequence.

For example, as shown in Table 2, the index Cellindex may be a value of a carrier indicator field (Carrier Indicator Field, CIF), and the CIF is configured by using higher layer signaling, and is used to identify a different carrier. It may be pre-configured on the base station or the UE that the relative offsets $n_{Cellindex}$ of candidates having a same serial number between carriers are serial numbers of the indexes Cellindex sequenced in ascending order. The first serial number sequence is in the form of 0, 1, 2 . . . , and a serial number interval is 1; therefore, locations of EPDCCH candidates of two carriers at the same aggregation level are spaced by 1.

carrier 1 is 1, and the CIF value of the carrier 2 is 6. Correspondingly, $n_{Cellindex}$ of the carrier 1 may be 1, $n_{Cellindex}$ of the carrier 2 may be 6, and in this way, a relative offset between EPDCCH candidates of the two carriers may also be implemented, thereby avoiding the problem that EPDCCH candidates of carriers at the same aggregation level overlap with each other.

In a second implementation manner of this embodiment, the determining the number of EPDCCH candidates at the aggregation level L of a carrier corresponding to an index Cellindex and an ECCE corresponding to each EPDCCH candidate includes obtaining an ECCE corresponding to an $m^{th}$ EPDCCH candidate according to the following formula:

$$L\left\{\left(Y_{p,k} + \left\lfloor \frac{m \Box N_{ECCE,p,k}}{L \Box M_p^{(L)}} \right\rfloor + n_{Cellindex} \left\lfloor \frac{N_{ECCE,p,k}}{L \Box M_p^{(L)} \Box n} \right\rfloor \right) \mod \lfloor N_{ECCE,p,k}/L \rfloor \right\} + i \quad \text{(Formula 2)}$$

where $Y_{p,k}$ is a random value related to subframe number k and EPDCCH set index p, p and k are both integers, $M_p^{(L)}$ is the number of EPDCCH candidates, of the UE, corresponding to the aggregation level L of the EPDCCH

TABLE 2

|  | ECCE0 | ECCE1 | ECCE2 | ECCE3 | ECCE4 | ECCE5 | ECCE6 | ECCE7 | ECCE8 |
|---|---|---|---|---|---|---|---|---|---|
| Carrier 1 | Candidate 1 |  |  |  | Candidate 2 |  |  |  | Candidate 3 |
| Carrier 2 |  | Candidate 1 |  |  |  | Candidate 2 |  |  |  |

|  | ECCE9 | ECCE10 | ECCE11 | ECCE12 | ECCE13 | ECCE14 | ECCE15 |
|---|---|---|---|---|---|---|---|
| Carrier 1 |  |  |  | Candidate 4 |  |  |  |
| Carrier 2 | Candidate 3 |  |  |  | Candidate 4 |  |  |

In Table 2, C=2, that is, the number of carriers required to be scheduled in cross-carrier scheduling is two, the two scheduled carriers are the carrier 1 and the carrier 2 respectively, a CIF value of the carrier 1 is 1, and a CIF value of the carrier 2 is 6. According to ascending order of the CIF, $n_{Cellindex}$ of the carrier with CIF=1 is 0, and $n_{Cellindex}$ of the carrier with CIF=6 is 1. For example, a centralized EPDCCH set has 4 PRB pairs, each PRB pair has 4 ECCEs, the aggregation level L of the EPDCCH of the carrier 1 and the aggregation level L of the EPDCCH of the carrier 2 are both 1, and the numbers of EPDCCH candidates of the two carriers are both 4. $Y_{p,k}$ is assumed to be 0; the first, second, third, and fourth EPDCCH candidates of the carrier 1 are ECCE0, ECCE4, ECCE8, and ECCE12 respectively; and the first, second, third, and fourth EPDCCH candidates of the carrier 2 are ECCE1, ECCE5, ECCE9, and ECCE13 respectively. In this way, although the numbers of the EPDCCH candidates of the two carriers at the aggregation level are the same, the locations of the EPDCCH candidates distributed in the EPDCCH resource set do not overlap with each other, and the EPDCCH candidates of the carrier 1 are staggered from those of the carrier 2; therefore, it can be ensured that when EPDCCHs of the carriers are placed in the EPDCCH candidates, EPDCCH blocking is not caused, and control information of the carrier 1 and the carrier 2 is prevented from being lost.

In the first implementation manner, optionally, $n_{Cellindex}$ may be a value of the index Cellindex.

For example, the index Cellindex of a carrier is further a CIF value corresponding to the carrier, the CIF value of the resource set p, $0 \leq i \leq L-1$, $0 \leq m \leq M_p^{(L)}-1$, n is the number of carriers, $\lfloor \ \rfloor$ is a rounding down symbol, and $$\left\lfloor \frac{N_{ECCE,p,k}}{L \Box M_p^{(L)} \Box n} \right\rfloor$$

has the same meaning as floor $$\left( \frac{N_{ECCE,p,k}}{L \Box M_p^{(K)} \Box n} \right)$$

and indicates rounding down of $$\frac{N_{ECCE,p,k}}{L \Box M_p^{(L)} \Box n}.$$

Similar to that in the first implementation manner of this embodiment, $n_{Cellindex}$ may be serial numbers sequenced according to the values of the indexes Cellindex in ascending order or in descending order, or $n_{Cellindex}$ may be a value of the index Cellindex, or $n_{Cellindex}$ may also be a predefined fixed value. Different from the first implementation manner of this embodiment, $n_{Cellindex}$ is multiplied by a coefficient $$\left\lfloor \frac{N_{ECCE,p,k}}{L \square M_p^{(L)} \square n} \right\rfloor,$$

so that the EPDCCH candidates of the carriers can be distributed on the whole frequency bandwidth of the EPDCCH resource set.

$n_{Cellindex}$ is a relative offset, which is related to the index Cellindex, of candidates having a same serial number between carriers. A value range of $n_{Cellindex}$ is from 0 to the number D1 of carriers in carrier aggregation of the user equipment minus 1 or to the number D2 of schedulable carriers of the user equipment in the EPDCCH set minus 1, and the schedulable carriers include carriers activated and deactivated in the EPDCCH set p by the user equipment in the subframe k.

Here, n may be obtained by using the following methods: n is the number Q of the carriers of the user equipment, or n is the number of schedulable carriers, of the user equipment, in the EPDCCH set p, where the schedulable carriers include carriers activated and deactivated in the EPDCCH set p by the user equipment in the subframe k. Specifically, according to the number Q of the carriers of the user equipment and a carrier scheduling indication value, configured by a system, of each of the carriers, the number n of carriers, among scheduled carriers corresponding to the EPDCCH set, scheduled by the user equipment is obtained; or, n is the number Q of carriers of in carrier aggregation of the user equipment. Assuming that the number of carriers in carrier aggregation of the user equipment is Q, on a certain carrier among the Q carriers, control information of this carrier and other carriers is scheduled; and the system activates or deactivates the Q carriers by using MAC signaling. For a deactivated carrier, the UE does not receive or send data on the carrier, and the base station does not receive or send the data of the UE on the carrier either. Meanwhile, the UE does not receive the EPDCCH for the carrier, and the base station does not send the EPDCCH for the carrier to the UE either. For an activated carrier, the UE receives and sends data on the carrier, and the base station receives and sends the data of the UE on the carrier. Meanwhile, the UE receives the EPDCCH for the carrier, and the base station also sends the EPDCCH for the carrier to the UE.

respectively. In this way, although the numbers of the candidate resources of the EPDCCHs of the two carriers at the same aggregation level are the same, the locations of the candidate resources distributed in the EPDCCH resource set do not overlap with each other, adjacent candidate resources in the total 8 candidate resources of the two carriers may be spaced by equal intervals, and the candidate resources of the two carriers are distributed in the EPDCCH resource set in a dispersed manner; therefore, EPDCCH blocking can be avoided, and moreover, the candidate resources are distributed on the whole frequency bandwidth as evenly as possible, so that a gain of selective scheduling of frequency is obtained, and the reliability of EPDCCH transmission is enhanced.

In a third implementation manner of this embodiment, the determining the number of EPDCCH candidates at the aggregation level L of a carrier corresponding to an index Cellindex and an ECCE corresponding to each EPDCCH candidate includes obtaining an ECCE corresponding to an $m^{th}$ EPDCCH candidate according to the following formula:

$$L\left\{\left(Y_{p,k} + \left\lfloor \frac{m' \square N_{ECCE,p,k}}{L \square M_p^{(L)} \square n} \right\rfloor\right) \bmod \lfloor N_{ECCE,p,k}/L \rfloor\right\} + i \quad \text{(Formula 3)}$$

where $Y_{p,k}$ is a random value related to subframe number k and EPDCCH set index p, p and k are both integers, $M_p^{(L)}$ is the number of EPDCCH candidates, of the UE, corresponding to the aggregation level L of the EPDCCH resource set $0 \leq i \leq L-1$, $0 \leq m \leq M_p^{(L)}-1$ m'= m·n+$n_{Cellindex}$, n is the number of carriers, and "·" has the same meaning as "×" and indicates multiplying.

$n_{Cellindex}$ is a relative offset, which is related to the index Cellindex, of candidates having a same serial number between carriers. A value range of $n_{Cellindex}$ is from 0 to the number D1 of carriers in carrier aggregation of the user equipment minus 1 or to the number D2 of schedulable carriers of the user equipment in the EPDCCH set minus 1, and the schedulable carriers include carriers activated and deactivated in the EPDCCH set p by the user equipment in the subframe k.

n is the number Q of the carriers of the user equipment, or n is the number of schedulable carriers of the user

TABLE 3

|  | ECCE0 | ECCE1 | ECCE2 | ECCE3 | ECCE4 | ECCE5 | ECCE6 | ECCE7 | ECCE8 |
|---|---|---|---|---|---|---|---|---|---|
| Carrier 1 | Candidate 1 |  |  |  | Candidate 2 |  |  |  | Candidate 3 |
| Carrier 2 |  |  | Candidate 1 |  |  |  | Candidate 2 |  |  |
|  |  | ECCE9 | ECCE10 | ECCE11 | ECCE12 | ECCE13 | ECCE14 | ECCE15 |  |
| Carrier 1 |  |  |  |  | Candidate 4 |  |  |  |  |
| Carrier 2 |  |  | Candidate 3 |  |  |  | Candidate 4 |  |  |

For example, as shown in Table 3, an EPDCCH resource set has 4 PRB pairs, EPDCCHs of 2 carriers are carried in the EPDCCH resource set, and cross-carrier scheduling is performed on the carrier 1 and the carrier 2. Aggregation levels of the EPDCCHs of the carrier 1 and the carrier 2 are both 1; the EPDCCHs of the two carriers have 4 candidate resources each; $Y_{p,k}$ is assumed to be 0; the first, second, third, and fourth candidate resources of the carrier 1 are ECCE0, ECCE4, ECCE8, and ECCE12 respectively; and the first, second, third, and fourth candidate resources of the carrier 2 are ECCE2, ECCE6, ECCE10, and ECCE14 equipment in the EPDCCH set p, where the schedulable carriers include carriers activated and deactivated in the EPDCCH set p by the user equipment in the subframe k.

Further, locations of EPDCCH candidates having a serial number in different carriers may be allocated in a resource block pair as far as possible. Specifically, carriers may be sequenced and numbered according to CIF values, to obtain the index Cellindex of each carrier, and if an EPDCCH candidate, whose serial number is k, at the aggregation level L of the carrier corresponding to the index Cellindex is at a relatively rear location in a resource block pair, candidate offsets of EPDCCH candidates, whose serial numbers are k, of other carriers at the same aggregation level L with the carrier have negative signs.

Specifically, an EPDCCH resource set has q PRB pairs, the number of ECCEs in a PRB pair is r, and the aggregation levels L of the carrier 1 may be 1, 2, 4, 8, 16, or 32 and so on. When r>L, at the aggregation level L, a PRB pair may have q×r/L potential EPDCCH candidates. A potential EPDCCH candidate indicates that the potential EPDCCH candidate may be selected as an EPDCCH candidate, and an EPDCCH candidate can carry an EPDCCH at the aggregation level L.

TABLE 4

| | ECCE0 | ECCE1 | ECCE2 | ECCE3 | ECCE4 | ECCE5 | ECCE6 | ECCE7 | ECCE8 |
|---|---|---|---|---|---|---|---|---|---|
| Carrier 1 | | | Candidate 1 | | | | | Candidate 2 | |
| Carrier 2 | | | | Candidate 1 | | | | | Candidate 2 |

| | ECCE9 | ECCE10 | ECCE11 | ECCE12 | ECCE13 | ECCE14 | ECCE15 |
|---|---|---|---|---|---|---|---|
| Carrier 1 | | | Candidate 3 | | | | Candidate 4 |
| Carrier 2 | | Candidate 3 | | | | Candidate 4 | |

For example, as shown in Table 4, ECCE0-ECCE3 belong to a first PRB pair, ECCE4-ECCE7 belong to a second PRB pair, ECCE8-ECCE11 belong to a third PRB pair, and ECCE12-ECCE15 belong to a fourth PRB pair. The carrier 1 and the carrier 2 have the same aggregation level; if an EPDCCH candidate, whose serial number is i, corresponding to an EPDCCH of the carrier 1 is on first q×r/L/2 potential EPDCCH candidates of a PRB pair, a location of an $i^{th}$ EPDCCH candidate of the carrier 2 and a location of an $i^{th}$ EPDCCH candidate of the carrier 1 are spaced by a candidate offset of +1; if an EPDCCH candidate, whose serial number is i, corresponding to an EPDCCH of the carrier 1 is on last q×r/L/2 potential EPDCCH candidates of a PRB pair, a location of an $i^{th}$ EPDCCH candidate of the carrier 2 and a location of an $i^{th}$ EPDCCH candidate of the carrier 1 are spaced by a candidate offset of −1.

In the EPDCCH candidate determining method provided by the embodiment of the present invention, during determination of an EPDCCH candidate used to carry an EPDCCH, EPDCCH candidates of two carriers at the same aggregation level are spaced by a candidate offset; as compared with a technology in the prior art where EPDCCH candidates corresponding to carriers at the same aggregation level completely overlap, EPDCCH candidates of different carriers can be staggered, so that an EPDCCH of each carrier can be successfully placed in a corresponding EPDCCH candidate, so as to prevent some EPDCCHs from being discarded due to overlapping of the EPDCCH candidates, thereby avoiding EPDCCH blocking, and improving reliability of control information transmission.

To make a person skilled in the art understand and apply the method of the present invention, another embodiment of the present invention provides an application embodiment, on a base station side, of an EPDCCH candidate determining method. This embodiment is used to send an EPDCCH of multiple carriers to a user equipment UE on an EPDCCH resource set of a carrier, and the UE may receive an EPDCCH of multiple carriers on an EPDCCH resource set. As shown in FIG. 2, the method of this embodiment includes:

201: A base station determines the EPDCCH resource set p in a subframe k, where the EPDCCH resource set p includes q resource block pairs, each of the resource block pairs corresponds to r enhanced control channel elements ECCEs, q>=1, r>=1, $N_{ECCE,p,k}$=q×r indicates the number of ECCEs in the EPDCCH resource set p, reference numerals of the $N_{ECCE,p,k}$ ECCEs are 0, 1, 2, . . . , $N_{ECCE,p,k}$−1 respectively, an EPDCCH candidate of the EPDCCH at an aggregation level L corresponds to L ECCEs having consecutive reference numerals, and an EPDCCH candidate is capable of carrying an EPDCCH.

202: The base station determines the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

203: The base station places a to-be-transmitted EPDCCH of the carrier corresponding to the index Cellindex in an EPDCCH candidate among multiple determined EPDCCH candidates, and sends the EPDCCH.

The to-be-transmitted EPDCCH is placed in an EPDCCH candidate among multiple EPDCCH candidates at the aggregation level L of the carrier corresponding to the index Cellindex, and sent to a UE. In this way, the UE may determine, by using different aggregation levels, an EPDCCH candidate corresponding to each aggregation level, and detects the to-be-transmitted EPDCCH in the determined EPDCCH candidates. When the UE detects a correct EPDCCH, the UE obtains control information of a $t^{th}$ carrier from the correct EPDCCH by means of parsing; when the UE fails to detect a correct EPDCCH, the UE continues to determine, by using another aggregation level, a corresponding EPDCCH candidate, and performs detection until a correct EPDCCH is detected or the q×r ECCEs are traversed.

204: The UE determines the EPDCCH resource set p in the subframe k, where the EPDCCH resource set p includes q resource block pairs, each of the resource block pairs corresponds to r enhanced control channel elements ECCEs, q>=1, r>=1, $N_{ECCE,p,k}$=q×r indicates the number of ECCEs in the EPDCCH resource set p, reference numerals of the $N_{ECCE,p,k}$ ECCEs are 0, 1, 2, . . . , $N_{ECCE,p,k}$)−1 respectively, an EPDCCH candidate of the EPDCCH at the aggregation level L corresponds to L ECCEs having consecutive reference numerals, and an EPDCCH candidate is capable of carrying an EPDCCH.

205: The UE determines the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

206: The UE detects the determined EPDCCH candidate corresponding to the aggregation level L of the carrier corresponding to the index Cellindex; when a correct EPDCCH is detected, the UE obtains control information of the carrier corresponding to the index Cellindex from the correct EPDCCH by means of parsing; when no correct EPDCCH is detected, by using another aggregation level, and the UE continues to determine the EPDCCH candidate corresponding to the aggregation level L of the carrier corresponding to the index Cellindex and performs detection until a correct EPDCCH is detected or the q×r ECCEs are traversed.

It should be noted that, for detailed descriptions of some steps in the embodiment of the present invention, reference may be made to the content in the embodiment corresponding to FIG. 1, which is not repeatedly described in detail in the embodiment of the present invention.

In the EPDCCH candidate determining method provided by the embodiment of the present invention, during determination of a candidate resource used to carry an EPDCCH, candidate resources of two carriers at the same aggregation level are spaced by a candidate offset; as compared with a technology in the prior art where candidate resources corresponding to carriers at the same aggregation level completely overlap, candidate resources of different carriers can be staggered, so that an EPDCCH of each carrier can be successfully placed in a corresponding candidate resource, so as to prevent some EPDCCHs from being discarded due to overlapping of the candidate resources, thereby avoiding EPDCCH blocking, and improving reliability of control information transmission.

Another embodiment of the present invention provides an EPDCCH candidate determining device, which is used in a cross-carrier scheduling process, where an EPDCCH candidate on at least two carriers is located in an EPDCCH resource set on one carrier among the at least two carriers, an aggregation level of the EPDCCH is L, and L>=1. As shown in FIG. 3, the device includes:

a first determining unit 31, configured to determine the EPDCCH resource set p in a subframe k, where the EPDCCH resource set p includes q resource block pairs, each of the resource block pairs corresponds to r enhanced control channel elements ECCEs, q>=1, r>=1, $N_{ECCE,p,k}$=q×r indicates the number of ECCEs in the EPDCCH resource set p, reference numerals of the $N_{ECCE,p,k}$ ECCEs are 0, 1, 2, . . . , $N_{ECCE,p,k}$−1 respectively, an EPDCCH candidate of the EPDCCH at the aggregation level L corresponds to L ECCEs having consecutive reference numerals, and an EPDCCH candidate is capable of carrying an EPDCCH; and a second determining unit 32, configured to determine the number of EPDCCH candidates at the aggregation level L of a carrier corresponding to an index Cellindex and an ECCE corresponding to each EPDCCH candidate in the EPDCCH resource set p determined by the first determining unit 31, where the ECCE corresponding to each EPDCCH candidate at the aggregation level L is related to the index Cellindex.

Further optionally, the second determining unit 32 is further configured to obtain an ECCE corresponding to an $m^{th}$ EPDCCH candidate according to the following formula:

$$L\left\{\left(Y_{p,k} + \left\lfloor \frac{m \Box N_{ECCE,p,k}}{L \Box M_p^{(L)}} \right\rfloor + n_{Cellindex}\right) \mod \lfloor N_{ECCE,p,k}/L \rfloor\right\} + i$$

where $Y_{p,k}$ is a random value related to subframe number k and the EPDCCH resource set p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, and $n_{Cellindex}$ is a predefined candidate offset of the carrier corresponding to the index Cellindex.

Further optionally, the second determining unit 32 is further configured to obtain an ECCE corresponding to an $m^{th}$ EPDCCH candidate according to the following formula:

$$L\left\{\left(Y_{p,k} + \left\lfloor \frac{m \Box N_{ECCE,p,k}}{L \Box M_p^{(L)}} \right\rfloor + n_{Cellindex} \left\lfloor \frac{N_{ECCE,p,k}}{L \Box M_p^{(L)} \Box n} \right\rfloor\right) \mod \lfloor N_{ECCE,p,k}/L \rfloor\right\} + i$$

where $Y_{p,k}$ is a random value related to subframe number k and EPDCCH set index p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, and n is the number of carriers.

Further optionally, the second determining unit 32 is further configured to obtain an ECCE corresponding to an $m^{th}$ EPDCCH candidate according to the following formula:

$$L\left\{\left(Y_{p,k} + \left\lfloor \frac{m' \Box N_{ECCE,p,k}}{L \Box M_p^{(L)} \Box n} \right\rfloor\right) \mod \lfloor N_{ECCE,p,k}/L \rfloor\right\} + i$$

where $Y_{p,k}$ is a random value related to subframe number k and EPDCCH set index p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, $m'=m\cdot n+n_{Cellindex}$ and n is the number of carriers.

Further, n is the number Q of carriers of the user equipment, or n is the number of schedulable carriers of the user equipment in the EPDCCH set p, including carriers activated and deactivated in the EPDCCH set p by the user equipment in the subframe k.

Further optionally, $n_{Cellindex}$ is a relative offset, which is related to the index Cellindex, of candidates having a same serial number between carriers.

A value range of $n_{Cellindex}$ is from 0 to the number D1 of carriers in carrier aggregation of the user equipment minus 1 or to the number D2 of schedulable carriers of the user equipment in the EPDCCH set minus 1, and the D2 schedulable carriers includes carriers activated and deactivated in the EPDCCH set p by the user equipment in the subframe k.

Further optionally, according to ascending order or descending order of the indexes Cellindex of the carriers, a first serial number sequence, which is sequentially numbered, is obtained starting from 0, and $n_{Cellindex}$ is a serial number value of the carrier index Cellindex in the first serial number sequence.

Further optionally, $n_{Cellindex}$ is a value of the index Cellindex.

In the EPDCCH candidate determining device provided by the embodiment of the present invention, during determination of a candidate resource used to carry an EPDCCH, candidate resources of two carriers at the same aggregation level are spaced by a candidate offset; as compared with a technology in the prior art where candidate resources corresponding to carriers at the same aggregation level completely overlap, candidate resources of different carriers can be staggered, so that an EPDCCH of each carrier can be successfully placed in a corresponding candidate resource, so as to prevent some EPDCCHs from being discarded due to overlapping of the candidate resources, thereby avoiding EPDCCH blocking, and improving reliability of control information transmission.

Another embodiment of the present invention provides an EPDCCH candidate determining device, which is used in a cross-carrier scheduling process, where an EPDCCH candidate on at least two carriers is located in an EPDCCH resource set on one carrier among the at least two carriers, an aggregation level of the EPDCCH is L, and L>=1. As shown in FIG. 4, the device includes:

a memory 41, configured to store program code used to determine an EPDCCH candidate; and a processor 42, configured to read and run the program code stored in the memory 41, where the program code is used to execute the following operations: determining the EPDCCH resource set p in a subframe k, where the EPDCCH resource set p includes q resource block pairs, each of the resource block pairs corresponds to r enhanced control channel elements ECCEs, q>=1, r>=1, $N_{ECCE,p,k}=q \times r$ indicates the number of ECCEs in the EPDCCH resource set p, reference numerals of the $N_{ECCE,p,k}$ ECCEs are 0, 1, 2, . . . , $N_{ECCE,p,k}-1$ respectively, an EPDCCH candidate of the EPDCCH at the aggregation level L corresponds to L ECCEs having consecutive reference numerals, and an EPDCCH candidate is capable of carrying an EPDCCH; and determining the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

Further optionally, the determining the number of EPDCCH candidates at the aggregation level L of a carrier corresponding to an index Cellindex and an ECCE corresponding to each EPDCCH candidate includes obtaining an ECCE corresponding to an $m^{th}$ EPDCCH candidate according to the following formula:

$$L\left\{\left(Y_{p,k} + \left\lfloor \frac{m \Box N_{ECCE,p,k}}{L \Box M_p^{(L)}} \right\rfloor + n_{Cellindex}\right) \bmod \lfloor N_{ECCE,p,k}/L \rfloor\right\} + i$$

where $Y_{p,k}$ is a random value related to subframe number k and the EPDCCH resource set p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, and $n_{Cellindex}$ is a predefined candidate offset of the carrier corresponding to the index Cellindex.

Further optionally, the determining the number of EPDCCH candidates at the aggregation level L of a carrier corresponding to an index Cellindex and an ECCE corresponding to each EPDCCH candidate includes obtaining an ECCE corresponding to an $m^{th}$ EPDCCH candidate according to the following formula:

$$L\left\{\left(Y_{p,k} + \left\lfloor \frac{m \Box N_{ECCE,p,k}}{L \Box M_p^{(L)}} \right\rfloor + n_{Cellindex} \left\lfloor \frac{N_{ECCE,p,k}}{L \Box M_p^{(L)} \Box n} \right\rfloor\right) \bmod \lfloor N_{ECCE,p,k}/L \rfloor\right\} + i$$

where $Y_{p,k}$ is a random value related to subframe number k and EPDCCH set index p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, and n is the number of carriers.

Further optionally, the determining the number of EPDCCH candidates at the aggregation level L of a carrier corresponding to an index Cellindex and an ECCE corresponding to each EPDCCH candidate includes obtaining an ECCE corresponding to an $m^{th}$ EPDCCH candidate according to the following formula:

$$L\left\{\left(Y_{p,k} + \left\lfloor \frac{m' \Box N_{ECCE,p,k}}{L \Box M_p^{(L)} \Box n} \right\rfloor\right) \bmod \lfloor N_{ECCE,p,k}/L \rfloor\right\} + i$$

where $Y_{p,k}$ is a random value related to subframe number k and EPDCCH set index p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, $m'=m \cdot n+n_{Cellindex}$ and n is the number of carriers.

Further optionally, n is the number Q of carriers of the user equipment, or n is the number of schedulable carriers of the user equipment in the EPDCCH set p, including carriers activated and deactivated in the EPDCCH set p by the user equipment in the subframe k.

Further optionally, $n_{Cellindex}$ is a relative offset, which is related to the index Cellindex, of candidates having a same serial number between carriers.

A value range of $n_{Cellindex}$ is from 0 to the number D1 of carriers in carrier aggregation of the user equipment minus 1 or to the number D2 of schedulable carriers of the user equipment in the EPDCCH set minus 1, and the D2 schedulable carriers includes carriers activated and deactivated in the EPDCCH set p by the user equipment in the subframe k.

Further optionally, according to ascending order or descending order of the indexes Cellindex of the carriers, a first serial number sequence, which is sequentially numbered, is obtained starting from 0, and $n_{Cellindex}$ is a serial number value of the carrier index Cellindex in the first serial number sequence.

Further optionally, $n_{Cellindex}$ is a value of the index Cellindex.

In the EPDCCH candidate determining device provided by the embodiment of the present invention, during determination of a candidate resource used to carry an EPDCCH, candidate resources of two carriers at the same aggregation level are spaced by a candidate offset; as compared with a technology in the prior art where candidate resources corresponding to carriers at the same aggregation level completely overlap, candidate resources of different carriers can be staggered, so that an EPDCCH of each carrier can be successfully placed in a corresponding candidate resource, so as to prevent some EPDCCHs from being discarded due to overlapping of the candidate resources, thereby avoiding EPDCCH blocking, and improving reliability of control information transmission.

Another embodiment of the present invention provides a base station, which is used in a cross-carrier scheduling process, where an EPDCCH candidate on at least two carriers is located in an EPDCCH resource set on one carrier among the at least two carriers, an aggregation level of the EPDCCH is L, and L>=1. The base station includes the EPDCCH candidate determining device shown in FIG. 3 or FIG. 4, and a sending device.

The EPDCCH candidate determining device is configured to determine the EPDCCH resource set p in a subframe k, where the EPDCCH resource set p includes q resource block pairs, each of the resource block pairs corresponds to r enhanced control channel elements ECCEs, $q \geq 1$, $r \geq 1$, $N_{ECCE,p,k}=q \times r$ indicates the number of ECCEs in the EPDCCH resource set p, reference numerals of the $N_{ECCE,p,k}$ ECCEs are 0, 1, 2, . . . , $N_{ECCE,p,k}-1$ respectively, an EPDCCH candidate of the EPDCCH at the aggregation level L corresponds to L ECCEs having consecutive reference numerals, and an EPDCCH candidate is capable of carrying an EPDCCH; and determine the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

The sending device is configured to place an EPDCCH of a carrier, whose index Cellindex is a carrier indicator field index Cellindex, in one EPDCCH candidate among EPDCCH candidates determined by the EPDCCH candidate determining device, and send the EPDCCH.

An embodiment of the present invention further provides a UE, which is used in a cross-carrier scheduling process, where an EPDCCH candidate on at least two carriers is located in an EPDCCH resource set on one carrier among the at least two carriers, an aggregation level of the EPDCCH is L, and $L \geq 1$. The UE includes an EPDCCH candidate determining device and a receiving device.

The EPDCCH candidate determining device is configured to determine the EPDCCH resource set p in a subframe k, where the EPDCCH resource set p includes q resource block pairs, each of the resource block pairs corresponds to r enhanced control channel elements ECCEs, $q \geq 1$, $r \geq 1$, $N_{ECCE,p,k}=q \times r$ indicates the number of ECCEs in the EPDCCH resource set p, reference numerals of the $N_{ECCE,p,k}$ ECCEs are 0, 1, 2, . . . , $N_{ECCE,p,k}-1$ respectively, an EPDCCH candidate of the EPDCCH at the aggregation level L corresponds to L ECCEs having consecutive reference numerals, and an EPDCCH candidate is capable of carrying an EPDCCH; and determine the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

The receiving device is configured to detect the EPDCCH candidate determined by the EPDCCH candidate determining device; when a correct EPDCCH is detected, obtain control information of the carrier, whose index Cellindex is a carrier indicator field index Cellindex, from the correct EPDCCH by means of parsing; and when no correct EPDCCH is detected, instruct the EPDCCH candidate determining device to continue to determine, by using another aggregation level, the number of EPDCCH candidates at the another aggregation level of the carrier corresponding to the index Cellindex and an ECCE corresponding to each EPDCCH candidate until a correct EPDCCH is detected or the q×r ECCEs are traversed.

An embodiment of the present invention further provides an EPDCCH transmission system, which includes the foregoing base station and UE in this embodiment.

In the UE, the base station, and the EPDCCH transmission system provided by the embodiments of the present invention, during determination of a candidate resource used to carry an EPDCCH, candidate resources of two carriers at the same aggregation level are spaced by a candidate offset; as compared with a technology in the prior art where candidate resources corresponding to carriers at the same aggregation level completely overlap, candidate resources of different carriers can be staggered, so that an EPDCCH of each carrier can be successfully placed in a corresponding candidate resource, so as to prevent some EPDCCHs from being discarded due to overlapping of the candidate resources, thereby avoiding EPDCCH blocking, and improving reliability of control information transmission.

Another embodiment of the present invention provides an ECSS resource determining method, which, as shown in FIG. 5, includes:

501: Configure, by using higher layer signaling, or determine, according to a predetermined rule, the number N of physical resources occupied by the ECSS.

The determining, according to a predetermined rule, the number of the physical resources occupied by the ECSS includes that: the number N of physical resources occupied by the ECSS is related to a system bandwidth. For example, the whole system bandwidth $N_{RB}$ is divided into $\lfloor N_{RB}/N \rfloor$ groups according to the number N of physical resource block pairs occupied by the ECSS. The number N of physical resource block pairs included in each group depends on the system bandwidth of current transmission, for example, when the system bandwidth $N_{RB}$ is equal to 6, N=2; when the system bandwidth $N_{RB}$ is greater than 6 and less than or equal to 25, N=4; in other cases, N=8.

The ECSS may be used for an EPDCCH of common control information, a random access response (RAR), or a multicast TPC Command, and so on.

502: Determine locations of the physical resources occupied by the ECSS, where the locations of the physical resources occupied by the ECSS are predefined locations related to at least one of a physical cell ID, a virtual cell ID, a subframe timeslot number, and a system bandwidth, or random locations related to at least one of a physical or virtual cell ID, a subframe timeslot number, and a system bandwidth.

In a first implementation manner of this embodiment, the locations of the physical resources occupied by the ECSS are predefined locations related to at least one of the physical cell ID, the virtual cell ID, the subframe timeslot number, and the system bandwidth.

The locations of the physical resources occupied by the ECSS being predefined locations related to at least one of a physical cell ID, a virtual cell ID, a subframe timeslot number, and a system bandwidth includes that: a fixed deviation exists between physical resource blocks occupied by an ECSS of each cell, and under different subframe timeslot numbers or different physical or virtual cell IDs, physical resource blocks occupied by an ECSS are different.

Further optionally, the locations of the physical resources occupied by the ECSS are:

$$Y_{k,i}=(Y_{k-1,0}+X) \bmod N_{RB}+(\lfloor N_{RB}/N \rfloor)*i$$

where $Y_{k-1,0}$ is a serial number of a first physical resource block pair occupied by an ECSS of a $(k-1)^{th}$ subframe, $Y_{-1,0}$ is a predefined value being the same for all cells, X is a virtual cell ID, N is the number of physical resource blocks occupied by the ECSS, i=0, 1, . . . , N−1, and $N_{RB}$ is the system bandwidth.

Further optionally, the locations of the physical resources occupied by the ECSS are:

$$Y_{k,i}=(Y_{k-1,i}+\text{offset}) \bmod N_{RB}$$

where $Y_{k-1,i}$ is a serial number of an $i^{th}$ physical resource block pair occupied by an ECSS of a $(k-1)^{th}$ subframe, offset may be a virtual cell ID or a subframe timeslot number, N is the number of physical resource blocks occupied by the ECSS, i=0, 1, ..., N−1, and $N_{RB}$ is the system bandwidth.

In a second possible implementation manner, the locations of the physical resources occupied by the ECSS are random locations related to at least one of the physical or virtual cell ID, the subframe timeslot number, and the system bandwidth.

Each physical resource occupied by the ECSS is randomly generated. Alternatively, a first physical resource occupied by the ECSS is randomly generated.

Further optionally, the locations of the physical resources occupied by the ECSS are:

$$Y_{k,i}=((A_i \cdot Y_{k-1,i}) \bmod D_i) \bmod N_{RB}$$

where i=0, 1, ..., N−1, $Y_{-1,i}=X$, $A_i=A+i*\text{offset}$, A=39827, $D_i=D+i*\text{offset}$, D=65537, $k=\lfloor n_s/2 \rfloor$, $n_s$ is a number of a timeslot in a subframe, X is a virtual cell ID, N is the number of physical resource blocks occupied by the ECSS, i=0, 1, ..., N−1, and $N_{RB}$ is the system bandwidth. Selection of the location of each physical resource block pair of the ECSS is determined by a cell-specific random function dynamically changeable for each subframe, such as a hash function, that is, each physical resource block pair of the ECSS is determined by a random function, and each subframe is dynamically changeable.

Further optionally, a cell-specific random function, such as a hash function, randomly deter mines a starting location of physical resource block pairs of an ECSS, and selection is performed at equal intervals with reference to Scheme 1. The first physical resource occupied by the ECSS is:

$$Y_k=((A \cdot Y_{k-1}) \bmod D) \bmod N_{RB}$$

where $Y_{-1}=X$, X is a virtual cell ID, A=39827, D=65537, $k=\lfloor n_s/2 \rfloor$, $n_s$ is a number of a timeslot in a subframe, other physical resources occupied by the ECSS are: $(Y_k+\lfloor N_{RB}/N \rfloor \cdot i) \bmod N_{RB}$, N is the number of physical resource blocks occupied by the ECSS, i=0, 1, ..., N−1, and $N_{RB}$ is the system bandwidth.

In a third implementation manner of this embodiment, the physical resources occupied by the ECSS being random locations related to at least one of a physical or virtual cell ID, a subframe timeslot number, and a system bandwidth includes that: the whole system bandwidth is divided into N predefined resource groups not overlapping with each other, the resource group may be formed by one or more physical resource block pairs, and physical resources occupied by the ECSS of different cells in different subframes are a random group, determined by the random function and related to at least one of the physical or virtual cell ID, the subframe timeslot number, and the system bandwidth, among the resource groups.

N physical resource block pairs of each group meet the following relationship: the whole system bandwidth is traversed; when selection is performed according to a maximum interval, and when the system bandwidth $N_{RB}$ cannot be exactly divided by the number N of the physical resource block pairs occupied by the ECSS, a rounded-up or rounded-down value of $N_{RB}/N$ is selected as the maximum interval. Further, the random function may be a hash (Hash) function.

In the ECSS resource determining method provided by the embodiment of the present invention, for an ECCS for transmitting common control information, physical resources of the ECCS are allocated reasonably, but no method relating to reasonable allocation of physical resources occupied by an ECSS is available in the prior art; therefore, the embodiment of the present invention eliminates a blind area in design, achieves inter-cell interference coordination and a frequency domain diversity gain, and improves transmission reliability of common control information of an EPDCCH.

Another embodiment of the present invention further provides an ECSS resource determining device, which, as shown in FIG. 6, includes:

a third determining unit 61, adapted to configure, by using higher layer signaling, or determine, according to a predetermined rule, the number N of physical resources occupied by the ECSS; and a fourth determining unit 62, configured to determine, according to the number N, determined by the third determining unit 61, of physical resources occupied by the ECSS, locations of the physical resources occupied by the ECSS, where the locations of the physical resources occupied by the ECSS are predefined locations related to at least one of a physical or virtual cell ID, a subframe timeslot number, and a system bandwidth, or random locations related to at least one of a physical or virtual cell ID, a subframe timeslot number, and a system bandwidth.

Further optionally, the number N of the physical resources occupied by the ECSS is related to the system bandwidth.

Further optionally, the locations of the physical resources occupied by the ECSS being predefined locations related to at least one of a physical cell ID, a virtual cell ID, a subframe timeslot number, and a system bandwidth includes that:

a fixed deviation exists between physical resource blocks occupied by an ECSS of each cell, and under different subframe timeslot numbers or different physical or virtual cell IDs, physical resource blocks occupied by an ECSS are different.

Further optionally, the locations, determined by the fourth determining unit 62, of the physical resources occupied by the ECSS are:

$$Y_{k,i}=(Y_{k-1,0}+X) \bmod N_{RB}+(\lfloor N_{RB}/N \rfloor)*i$$

where $Y_{k-1,0}$ is a serial number of a first physical resource block pair occupied by an ECSS of a $(k-1)^{th}$ subframe, $Y_{-1,0}$ is a predefined value being the same for all cells, X is a virtual cell ID, N is the number of physical resource blocks occupied by the ECSS, i=0, 1, ..., N−1, and $N_{RB}$ is the system bandwidth.

Further optionally, the locations, determined by the fourth determining unit 62, of the physical resources occupied by the ECSS are:

$$Y_{k,i}=(Y_{k-1,i}+\text{offset}) \bmod N_{RB}$$

where $Y_{k-1,i}$ is a serial number of an $i^{th}$ physical resource block pair occupied by an ECSS of a $(k-1)^{th}$ subframe, offset may be a virtual cell ID or a subframe timeslot number, N is the number of physical resource blocks occupied by the ECSS, i=0, 1, ..., N−1, and $N_{RB}$ is the system bandwidth.

Further optionally, the physical resources occupied by the ECSS being random locations related to at least one of a physical or virtual cell ID, a subframe timeslot number, and a system bandwidth includes that:

each physical resource occupied by the ECSS is randomly generated;

alternatively, a first physical resource occupied by the ECSS is randomly generated.

Further optionally, the locations, determined by the fourth determining unit 62, of the physical resources occupied by the ECSS are:

$$Y_{k,i}=((A_i \cdot Y_{k-1,i}) \bmod D_i) \bmod N_{RB}$$

where $Y_{-1,i}=X$, $A_i=A+i*\text{offset}$, A=39827, $D_i=D+i*\text{offset}$, D=65537, $k=\lfloor n_s/2 \rfloor$, $n_s$ is a number of a timeslot in a subframe, X is a virtual cell ID, N is the number of physical resource blocks occupied by the ECSS, i=0, 1, . . . , N−1, and $N_{RB}$ is the system bandwidth.

Further optionally, the first physical resource, determined by the fourth determining unit 62, occupied by the ECSS is:

$$Y_k=((A \cdot Y_{k-1}) \bmod D) \bmod N_{RB}$$

where $Y_{-1}=X$, X is a virtual cell ID, A=39827, D=65537, $k=\lfloor n_s/2 \rfloor$, $n_s$ is a number of a timeslot in a subframe, other physical resources occupied by the ECSS are: $(Y_k+\lfloor N_{RB}/N \rfloor \cdot i) \bmod N_{RB}$, N is the number of physical resource blocks occupied by the ECSS, i=0, 1, . . . , N−1, and $N_{RB}$ is the system bandwidth.

Further optionally, the physical resources occupied by the ECSS being random locations related to at least one of a physical or virtual cell ID, a subframe timeslot number, and a system bandwidth includes that:

the whole system bandwidth is divided into N groups of predefined resources not overlapping with each other, and physical resources occupied by the ECSS of different cells in different subframes are a random group, determined by a random function and related to at least one of the physical or virtual cell ID, the subframe timeslot number, and the system bandwidth, among the resource groups.

Further optionally, the random function is a hash (Hash) function.

In the ECSS resource determining device provided by the embodiment of the present invention, for an ECCS for transmitting common control information, physical resources of the ECCS are allocated reasonably, but no method relating to reasonable allocation of physical resources occupied by an ECCS is available in the prior art; therefore, the embodiment of the present invention eliminates a blind area in design, achieves inter-cell interference coordination and a frequency domain diversity gain, and improves transmission reliability of common control information of an EPDCCH.

Figure 7:
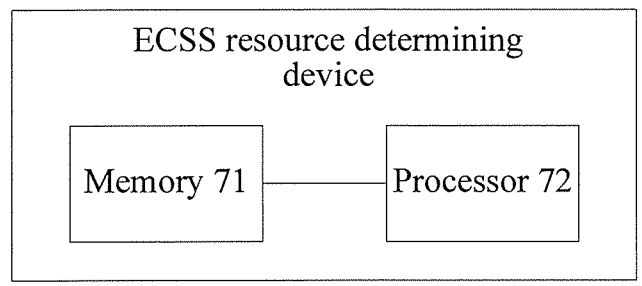
FIG. 7 is a schematic structural diagram of an ECSS resource determining device in another embodiment of the present invention.

Another embodiment of the present invention further provides an ECSS resource determining device, which, as shown in FIG. 7, includes:

a memory 71, configured to store program code used to determine an ECSS resource; and a processor 72, configured to read and run the program code stored in the memory 71, where the program code is used to execute the following operations: configuring, by using higher layer signaling, or determining, according to a predetermined rule, the number N of physical resources occupied by the ECSS; and determining locations of the physical resources occupied by the ECSS, where the locations of the physical resources occupied by the ECSS are predefined locations related to at least one of a physical or virtual cell ID, a subframe timeslot number, and a system bandwidth, or random locations related to at least one of a physical or virtual cell ID, a subframe timeslot number, and a system bandwidth.

Further optionally, the number N of the physical resources occupied by the ECSS is related to the system bandwidth.

Further optionally, the locations of the physical resources occupied by the ECSS being predefined locations related to at least one of a physical cell ID, a virtual cell ID, a subframe timeslot number, and a system bandwidth includes that:

a fixed deviation exists between physical resource blocks occupied by an ECSS of each cell, and under different subframe timeslot numbers or different physical or virtual cell IDs, physical resource blocks occupied by an ECSS are different.

Further optionally, the locations, determined by the processor, of the physical resources occupied by the ECSS are:

$$Y_{k,i}=(Y_{k-1,0}+X) \bmod N_{RB}+(\lfloor N_{RB}/N \rfloor)*i$$

where $Y_{k-1,0}$ is a serial number of a first physical resource block pair occupied by an ECSS of a $(k-1)^{th}$ subframe, $Y_{-1,0}$ is a predefined value being the same for all cells, X is a virtual cell ID, N is the number of physical resource blocks occupied by the ECSS, i=0, 1, . . . , N−1, and $N_{RB}$ is the system bandwidth.

Further optionally, the locations, determined by the processor, of the physical resources occupied by the ECSS are:

$$Y_{k,i}=(Y_{k-1,i}+\text{offset}) \bmod N_{RB}$$

where $Y_{k-1,i}$ is a serial number of an $i^{th}$ physical resource block pair occupied by an ECSS of a $(k-1)^{th}$ subframe, offset may be a virtual cell ID or a subframe timeslot number, N is the number of physical resource blocks occupied by the ECSS, i=0, 1, . . . , N−1, and $N_{RB}$ is the system bandwidth.

Further optionally, the physical resources occupied by the ECSS being random locations related to at least one of a physical or virtual cell ID, a subframe timeslot number, a system bandwidth includes that:

each physical resource occupied by the ECSS is randomly generated;

alternatively, a first physical resource occupied by the ECSS is randomly generated.

Further optionally, the locations, determined by the processor, of the physical resources occupied by the ECSS are:

$$Y_{k,i}=((A_i \cdot Y_{k-1,i}) \bmod D_i) \bmod N_{RB}$$

where $Y_{-1,i}=X$, $A_i=A+i*\text{offset}$, A=39827, $D_i=D+i*\text{offset}$, D=65537, $k=\lfloor n_s/2 \rfloor$, $n_s$ is a number of a timeslot in a subframe, X is a virtual cell ID, N is the number of physical resource blocks occupied by the ECSS, i=0, 1, . . . , N−1, and $N_{RB}$ is the system bandwidth.

Further optionally, the first physical resource, determined by the processor, occupied by the ECSS is:

$$Y_k=((A \cdot Y_{k-1}) \bmod D) \bmod N_{RB}$$

where $Y_{-1}=X$, X is a virtual cell ID, A=39827, D=65537, $k=\lfloor n_s/2 \rfloor$, $n_s$ is a number of a timeslot in a subframe, other physical resources occupied by the ECSS are: $(Y_k+\lfloor N_{RB}/N \rfloor \cdot i) \bmod N_{RB}$, N is the number of physical resource blocks occupied by the ECSS, i=0, 1, . . . , N−1, and $N_{RB}$ is the system bandwidth.

Further optionally, the physical resources occupied by the ECSS being random locations related to at least one of a physical or virtual cell ID, a subframe timeslot number, and a system bandwidth includes that:

the whole system bandwidth is divided into N groups of predefined resources not overlapping with each other, and physical resources occupied by the ECSS of different cells in different subframes are a random group, determined by a random function and related to at least one of the physical or virtual cell ID, the subframe timeslot number, and the system bandwidth, among the resource groups.

Further optionally, the random function is a hash (Hash) function.

In the ECSS resource determining device provided by the embodiment of the present invention, for an ECCS for transmitting common control information, physical resources of the ECCS are allocated reasonably, but no method relating to reasonable allocation of physical resources occupied by an ECCS is available in the prior art; therefore, the embodiment of the present invention eliminates a blind area in design, achieves inter-cell interference coordination and a frequency domain diversity gain, and improves transmission reliability of common control information of an EPDCCH.

Another embodiment of the present invention further provides a base station, which is used in a cross-carrier scheduling process, where an EPDCCH candidate on at least two carriers is located in an EPDCCH resource set on one carrier among the at least two carriers, an aggregation level of the EPDCCH is L, and L>=1. The base station includes: an ECSS resource determining device and a sending device.

The EPDCCH candidate determining device is configured to determine the EPDCCH resource set p in a subframe k, where the EPDCCH resource set p includes q resource block pairs, each of the resource block pairs corresponds to r enhanced control channel elements ECCEs, q>=1, r>=1, $N_{ECCE,p,k}$=q×r indicates the number of ECCEs in the EPDCCH resource set p, reference numerals of the $N_{ECCE,p,k}$ ECCEs are 0, 1, 2, . . . , $N_{ECCE,p,k}$−1 respectively, an EPDCCH candidate of the EPDCCH at the aggregation level L corresponds to L ECCEs having consecutive reference numerals, and an EPDCCH candidate is capable of carrying an EPDCCH; and determine the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

The sending device is configured to place the ECSS in a physical resource, determined by the ECSS resource determining device, occupied by the ECSS, and send a carrier in which the ECSS is placed.

An embodiment of the present invention further provides a UE, which is used in a cross-carrier scheduling process, where an EPDCCH candidate on at least two carriers is located in an EPDCCH resource set on one carrier among the at least two carriers, an aggregation level of the EPDCCH is L, and L>=1. The UE includes: an ECSS resource determining device and a receiving device.

The EPDCCH candidate determining device is configured to determine the EPDCCH resource set p in a subframe k, where the EPDCCH resource set p includes q resource block pairs, each of the resource block pairs corresponds to r enhanced control channel elements ECCEs, q>=1, r>=1, $N_{ECCE,p,k}$=q×r indicates the number of ECCEs in the EPDCCH resource set p, reference numerals of the $N_{ECCE,p,k}$ ECCEs are 0, 1, 2, . . . , $N_{ECCE,p,k}$−1 respectively, an EPDCCH candidate of the EPDCCH at the aggregation level L corresponds to L ECCEs having consecutive reference numerals, and an EPDCCH candidate is capable of carrying an EPDCCH; and determine the number of EPDCCH candidates at the aggregation level L of a carrier corresponding to an index Cellindex and an ECCE corresponding to each EPDCCH candidate, where the ECCE corresponding to each EPDCCH candidate at the aggregation level L is related to the index Cellindex.

The receiving device is configured to detect the ECSS in a physical resource, determined by the ECSS resource determining device, occupied by the ECSS, and obtain common control information of a cell by means of parsing.

Another embodiment of the present invention further provides an ECSS transmission system, which includes the foregoing base station and UE in this embodiment.

In the base station, the UE, and the ECSS transmission system provided by the embodiment of the present invention, for an ECCS for transmitting common control information, physical resources of the ECCS are allocated reasonably, but no method relating to reasonable allocation of physical resources occupied by an ECCS is available in the prior art; therefore, the embodiment of the present invention eliminates a blind area in design, achieves inter-cell interference coordination and a frequency domain diversity gain, and improves transmission reliability of common control information of an EPDCCH.

Through the foregoing description of the embodiments, a person skilled in the art may clearly understand that the present invention may be implemented by software in addition to necessary universal hardware, and definitely may also be implemented by hardware. However, under most circumstances, the former is preferred. Based on such an understanding, the technical solutions of the present invention essentially, or the part contributing to the prior art may be implemented in the fault of a software product. The computer software product is stored in a readable storage medium, for example, a floppy disc, a hard disk, or an optical disc of a computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An enhanced physical downlink control channel EPDCCH candidate determining method, used in a cross-carrier scheduling process, wherein an EPDCCH candidate on at least two carriers is located on an EPDCCH resource set on one carrier among the at least two carriers, an aggregation level of the EPDCCH is L, and L>=1, the method comprising:

determining, by a base station, the EPDCCH resource set p in a subframe k, wherein the EPDCCH resource set p comprises q resource block pairs, each of the resource block pairs corresponds to r enhanced control channel elements ECCEs, q>=1, r>=1, $N_{ECCE,p,k}$=q×r indicates a number of ECCEs in the EPDCCH resource set p, reference numerals of the $N_{ECCE,p,k}$ ECCEs are 0, 1, 2, . . . , $N_{ECCE,p,k}$−1 respectively, an EPDCCH candidate of the EPDCCH at the aggregation level L corresponds to L ECCEs having consecutive reference numerals, and an EPDCCH candidate is capable of carrying an EPDCCH; and determining, by the base station, the number of EPDCCH candidates at the aggregation level L of a carrier corresponding to an index Cellindex and an ECCE corresponding to each EPDCCH candidate, wherein the ECCE corresponding to each EPDCCH candidate at the aggregation level L is related to the index Cellindex;

wherein the determining the number of EPDCCH candidates at the aggregation level L of a carrier corresponding to an index Cellindex and an ECCE corresponding to each EPDCCH candidate comprises obtaining an ECCE corresponding to an $m^{th}$ EPDCCH candidate according to the following formula:

$$L\left\{\left(Y_{p,k} + \left\lfloor \frac{m \Box N_{ECCE,p,k}}{L \Box M_p^{(L)}} \right\rfloor + n_{Cellindex}\right) \bmod \lfloor N_{ECCE,p,k}/L \rfloor\right\} + i$$

wherein $Y_{p,k}$ is a random value related to subframe number k and the EPDCCH resource set p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, and $n_{Cellindex}$ is a predefined candidate offset of the carrier corresponding to the index Cellindex;

sending, by the base station, an EPDCCH, wherein the EPDCCH is in one EPDCCH candidate among EPDCCH candidates.

2. The EPDCCH candidate determining method according to claim 1, wherein
$n_{Cellindex}$ is a relative offset, which is related to the index Cellindex, of candidates having a same serial number between carriers; and
a value range of $n_{Cellindex}$ is from 0 to the number D1 of carriers in carrier aggregation of the user equipment minus 1 or to the number D2 of schedulable carriers of the user equipment in the EPDCCH set minus 1, and the D2 schedulable carriers comprises carriers activated and deactivated in the EPDCCH set p by the user equipment in the subframe k.

3. The EPDCCH candidate determining method according to claim 1, wherein
according to ascending order or descending order of the indexes Cellindex of the carriers, a first serial number sequence, which is sequentially numbered, is obtained starting from 0, and $n_{Cellindex}$ is Cellindex a serial number value of the carrier index Cellindex in the first serial number sequence.

4. The EPDCCH candidate determining method according to claim 1, wherein
$n_{Cellindex}$ is a value of the index Cellindex.

5. An enhanced physical downlink control channel EPDCCH candidate determining device, used in a cross-carrier scheduling process, wherein an EPDCCH candidate on at least two carriers is located on an EPDCCH resource set on one carrier among the at least two carriers, an aggregation level of the EPDCCH is L, and L>=1, the device comprising:

a processor, configured to determine the EPDCCH resource set p in a subframe k, wherein the EPDCCH resource set p comprises q resource block pairs, each of the resource block pairs corresponds to r enhanced control channel elements ECCEs, $q>=1$, $r>=1$, $N_{ECCE,p,k}=q\times r$ indicates a number of ECCEs in the EPDCCH resource set p, reference numerals of the $N_{ECCE,p,k}$ ECCEs are 0, 1, 2, . . . , $N_{ECCE,p,k}-1$ respectively, an EPDCCH candidate of the EPDCCH at the aggregation level L corresponds to L ECCEs having consecutive reference numerals, and an EPDCCH candidate is capable of carrying an EPDCCH; and the processor, is further configured to determine the number of EPDCCH candidates at the aggregation level L of a carrier corresponding to an index Cellindex and an ECCE corresponding to each EPDCCH candidate in the EPDCCH resource set p determined by the processor, wherein the ECCE corresponding to each EPDCCH candidate at the aggregation level L is related to the index Cellindex;

wherein the processor is further configured to obtain an ECCE corresponding to an $m^{th}$ EPDCCH candidate according to the following formula:

$$L\left\{\left(Y_{p,k}+\left\lfloor\frac{m\square N_{ECCE,p,k}}{L\square M_p^{(L)}}\right\rfloor\right)+n_{Cellindex}\right)\bmod\lfloor N_{ECCE,p,k}/L\rfloor\right\}+i$$

wherein $Y_{p,k}$ is a random value related to subframe number k and the EPDCCH resource set p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, and $n_{Cellindex}$ is a predefined candidate offset of the carrier corresponding to the index Cellindex;

a transmitter, configured to send an EPDCCH, wherein the EPDCCH is in one EPDCCH candidate among EPDCCH candidates.

6. The EPDCCH candidate determining device according to claim 5, wherein
$n_{Cellindex}$ is a value of the index Cellindex.

7. An enhanced physical downlink control channel EPDCCH candidate determining device, used in a cross-carrier scheduling process, wherein an EPDCCH candidate on at least two carriers is located on an EPDCCH resource set on one carrier among the at least two carriers, an aggregation level of the EPDCCH is L, and L>=1, the device comprising:

a memory, configured to store program code used to determine an EPDCCH candidate; and
a processor, configured to read and run the program code stored in the memory, wherein the program code is used to execute the following operations:

determining the EPDCCH resource set p in a subframe k, wherein the EPDCCH resource set p comprises q resource block pairs, each of the resource block pairs corresponds to r enhanced control channel elements ECCEs, $q>=1$, $r>=1$, $N_{ECCE,p,k}=q\times r$ indicates a number of ECCEs in the EPDCCH resource set p, reference numerals of the $N_{ECCE,p,k}$ ECCEs are 0, 1, 2, . . . , $N_{ECCE,p,k}-1$ respectively, an EPDCCH candidate of the EPDCCH at the aggregation level L corresponds to L ECCEs having consecutive reference numerals, and an EPDCCH candidate is capable of carrying an EPDCCH; and determining the number of EPDCCH candidates at the aggregation level L of a carrier corresponding to an index Cellindex and an ECCE corresponding to each EPDCCH candidate, wherein the ECCE corresponding to each EPDCCH candidate at the aggregation level L is related to the index Cellindex;

wherein determining the number of EPDCCH candidates at the aggregation level L of a carrier corresponding to an index Cellindex and an ECCE corresponding to each EPDCCH candidate comprises obtaining an ECCE corresponding to an $m^{th}$ EPDCCH candidate according to the following formula:

$$L\left\{\left(Y_{p,k}+\left\lfloor\frac{m\square N_{ECCE,p,k}}{L\square M_p^{(L)}}\right\rfloor\right)+n_{Cellindex}\right)\bmod\lfloor N_{ECCE,p,k}/L\rfloor\right\}+i$$

wherein $Y_{p,k}$ is a random value related to subframe number k and the EPDCCH resource set p, p and k are both integers, $M_p^{(L)}$ is the number of EPDCCH candidates, of a user equipment UE corresponding to the EPDCCH candidate, corresponding to the aggregation level L of the EPDCCH resource set p, 0<=i<=L−1, 0<=m<=$M_p^{(L)}$−1, and $n_{Cellindex}$ is a predefined candidate offset of the carrier corresponding to the index Cellindex;

sending, an EPDCCH, wherein the EPDCCH is in one EPDCCH candidate among EPDCCH candidates.

8. The EPDCCH candidate determining device according to claim 7, wherein
$n_{Cellindex}$ is a value of the index Cellindex.

9. An enhanced physical downlink control channel (EPDCCH) candidate determining method, used in a cross-carrier scheduling process, wherein an EPDCCH candidate on at least two carriers is located on an EPDCCH resource set on one carrier among the at least two carriers, an aggregation level of the EPDCCH is L, and L>=1, the method comprising:

determining, by a user equipment, the EPDCCH resource set p in a subframe k, wherein the EPDCCH resource set p comprises q resource block pairs, each of the resource block pairs corresponds to r enhanced control channel elements ECCEs, q>=1, r>=1, $N_{ECCE,p,k}$=q×r indicates the number of ECCEs in the EPDCCH resource set p, reference numerals of the $N_{ECCE,p,k}$ ECCEs are 0, 1, 2, . . . , $N_{ECCE,p,k}$−1 respectively, an EPDCCH candidate of the EPDCCH at the aggregation level L corresponds to L ECCEs having consecutive reference numerals, and an EPDCCH candidate is capable of carrying an EPDCCH; and determining, by the user equipment, the number of EPDCCH candidates at the aggregation level L of a carrier corresponding to an index Cellindex and an ECCE corresponding to each EPDCCH candidate, wherein the ECCE corresponding to each EPDCCH candidate at the aggregation level L is related to the index Cellindex;

wherein the determining the number of EPDCCH candidates at the aggregation level L of a carrier corresponding to an index Cellindex and an ECCE corresponding to each EPDCCH candidate comprises obtaining an ECCE corresponding to an $m^{th}$ EPDCCH candidate according to the following formula:

$$L\left\{\left(Y_{p,k} + \left\lfloor \frac{m \square N_{ECCE,p,k}}{L \square M_p^{(L)}} \right\rfloor + n_{Cellindex}\right) \mod \lfloor N_{ECCE,p,k}/L \rfloor \right\} + i$$

wherein $Y_{p,k}$ is a random value related to subframe number k and the EPDCCH resource set p, p and k are both integers, $M_p^{(L)}$ is the number of EPDCCH candidates, of a user equipment UE corresponding to the EPDCCH candidate, corresponding to the aggregation level L of the EPDCCH resource set p, 0<=i<=L−1, 0<=m<=$M_p^{(L)}$−1, and $n_{Cellindex}$ is a predefined candidate offset of the carrier corresponding to the index Cellindex;

receiving, by the user equipment, an EPDCCH, wherein the EPDCCH is in one EPDCCH candidate among EPDCCH candidates.

10. The EPDCCH candidate determining method according to claim 9, wherein $n_{Cellindex}$ is a value of the index Cellindex.

11. A user equipment, used in a cross-carrier scheduling process, wherein an enhanced physical downlink control channel (EPDCCH) candidate on at least two carriers is located on an EPDCCH resource set on one carrier among the at least two carriers, an aggregation level of the EPDCCH is L, and L>=1, comprising:

a processor, configured to:
determine the EPDCCH resource set p in a subframe k, wherein the EPDCCH resource set p comprises q resource block pairs, each of the resource block pairs corresponds to r enhanced control channel elements ECCEs, q>=1, r>=1, $N_{ECCE,p,k}$=q×r indicates a number of ECCEs in the EPDCCH resource set p, reference numerals of the $N_{ECCE,p,k}$ ECCEs are 0, 1, 2, . . . , $N_{ECCE,p,k}$−1 respectively, an EPDCCH candidate of the EPDCCH at the aggregation level L corresponds to L ECCEs having consecutive reference numerals, and an EPDCCH candidate is capable of carrying an EPDCCH;

determine the number of EPDCCH candidates at the aggregation level L of a carrier corresponding to an index Cellindex and an ECCE corresponding to each EPDCCH candidate in the EPDCCH resource set p determined by the processor, wherein the ECCE corresponding to each EPDCCH candidate at the aggregation level L is related to the index Cellindex;

obtain an ECCE corresponding to an $m^{th}$ EPDCCH candidate according to the following formula:

$$L\left\{\left(Y_{p,k} + \left\lfloor \frac{m \square N_{ECCE,p,k}}{L \square M_p^{(L)}} \right\rfloor + n_{Cellindex}\right) \mod \lfloor N_{ECCE,p,k}/L \rfloor \right\} + i$$

wherein $Y_{p,k}$ is a random value related to subframe number k and the EPDCCH resource set p, p and k are both integers, $M_p^{(L)}$ is the number of EPDCCH candidates, of a user equipment UE corresponding to the EPDCCH candidate, corresponding to the aggregation level L of the EPDCCH resource set p, 0<=i<=L−1, 0<=m<=$M_p^{(L)}$−1, and $n_{Cellindex}$ is a predefined candidate offset of the carrier corresponding to the index Cellindex; and a receiver, configured to receive an EPDCCH, wherein the EPDCCH is in one EPDCCH candidate among EPDCCH candidates.

12. The user equipment according to claim 11, wherein $n_{Cellindex}$ is a value of the index Cellindex.

13. An enhanced physical downlink control channel (EPDCCH) candidate determining device, used in a cross-carrier scheduling process, wherein an EPDCCH candidate on at least two carriers is located on an EPDCCH resource set on one carrier among the at least two carriers, an aggregation level of the EPDCCH is L, and L>=1, the device comprising:

a memory, configured to store program code used to determine an EPDCCH candidate; and a processor, configured to read and run the program code stored in the memory, wherein the program code is used to execute the following operations:
determining the EPDCCH resource set p in a subframe k, wherein the EPDCCH resource set p comprises q resource block pairs, each of the resource block pairs corresponds to r enhanced control channel elements ECCEs, q>=1, r>=1, $N_{ECCE,p,k}$=q×r indicates the number of ECCEs in the EPDCCH resource set p, reference numerals of the $N_{ECCE,p,k}$ ECCEs are 0, 1, 2, . . . , $N_{ECCE,p,k}$−1 respectively, an EPDCCH candidate of the EPDCCH at the aggregation level L corresponds to L ECCEs having consecutive reference numerals, and an EPDCCH candidate is capable of carrying an EPDCCH; and determining the number of EPDCCH candidates at the aggregation level L of a carrier corresponding to an index Cellindex and an ECCE corresponding to each EPDCCH candidate, wherein the ECCE corresponding to each EPDCCH candidate at the aggregation level L is related to the index Cellindex;

wherein determining the number of EPDCCH candidates at the aggregation level L of a carrier corresponding to an index Cellindex and an ECCE corresponding to each EPDCCH candidate comprises obtaining an ECCE corresponding to an $m^{th}$ EPDCCH candidate according to the following formula:

$$L\left\{\left(Y_{p,k} + \left\lfloor \frac{m \square N_{ECCE,p,k}}{L \square M_p^{(L)}} \right\rfloor + n_{Cellindex}\right) \bmod \lfloor N_{ECCE,p,k}/L \rfloor\right\} + i$$

wherein $Y_{p,k}$ is a random value related to subframe number k and the EPDCCH resource set p, p and k are both integers, $M_p^{(L)}$ is the number of EPDCCH candidates, of a user equipment UE corresponding to the EPDCCH candidate, corresponding to the aggregation level L of the EPDCCH resource set p, $0<=i<=L-1$, $0<=m<=M_p^{(L)}-1$, and $n_{Cellindex}$ is a predefined candidate offset of the carrier corresponding to the index Cellindex; and receiving, an EPDCCH, wherein the EPDCCH is in one EPDCCH candidate among EPDCCH candidates.

14. The device according to claim 13, wherein $n_{Cellindex}$ is a value of the index Cellindex.

* * * * *